(12) United States Patent
Sato

(10) Patent No.: US 7,283,182 B2
(45) Date of Patent: Oct. 16, 2007

(54) ELECTRO-OPTICAL DEVICE, ELECTRONIC APPARATUS, AND METHOD OF MANUFACTURING ELECTRO-OPTICAL DEVICE

(75) Inventor: Takashi Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 429 days.

(21) Appl. No.: 11/028,446

(22) Filed: Jan. 4, 2005

(65) Prior Publication Data

US 2005/0146649 A1    Jul. 7, 2005

(30) Foreign Application Priority Data

| Jan. 7, 2004 | (JP) | ............................. 2004-002095 |
| Jan. 9, 2004 | (JP) | ............................. 2004-004130 |
| Sep. 21, 2004 | (JP) | ............................. 2004-272878 |

(51) Int. Cl.
*G02F 1/1333* (2006.01)
*G02F 1/136* (2006.01)

(52) U.S. Cl. ......................................... 349/44; 349/110

(58) Field of Classification Search .................. 349/44, 349/110
See application file for complete search history.

(56) References Cited

U.S. PATENT DOCUMENTS

| 5,414,547 | A | 5/1995 | Matsuo et al. |
| 6,872,975 | B2 | 3/2005 | Murade |
| 7,019,807 | B2 * | 3/2006 | Yamasaki .................... 349/138 |
| 7,176,989 | B2 * | 2/2007 | Takahara et al. .............. 349/39 |

FOREIGN PATENT DOCUMENTS

| CN | A-1438523 | 8/2003 |
| JP | A-09-43639 | 2/1997 |
| JP | A-11-265002 | 9/1999 |
| JP | A-2000-267596 | 9/2000 |
| JP | A-2001-305580 | 10/2001 |
| JP | A 2002-107763 | 4/2002 |
| JP | A 2002-156652 | 5/2002 |
| JP | A-2002-244153 | 8/2002 |
| JP | A-2003-121879 | 4/2003 |
| JP | A 2003-197917 | 7/2003 |
| JP | A-2003-280033 | 10/2003 |
| JP | A-2003-308029 | 10/2003 |
| KR | 2003-0096562 | 12/2003 |

* cited by examiner

*Primary Examiner*—David Nelms
*Assistant Examiner*—David Chung
(74) *Attorney, Agent, or Firm*—Oliff & Berridge, PLC

(57) ABSTRACT

It is an object of exemplary embodiments of the invention to realize a decrease in size and increase in accuracy with a simple structure and to perform high-quality display. According to exemplary embodiments of the invention, data lines, scanning lines, thin film transistors, storage capacitors, shield layers, and pixel electrodes are provided on a substrate. Each shield layer includes a first conductive light-shielding film which is formed in a non-open area between pixels using a plurality of interlayer insulating films disposed on a storage capacitor as an underlying layer and is electrically connected to a fixed-potential side electrode of the storage capacitor through a contact hole integrally penetrating the plurality of interlayer insulating films. Each shield layer is electrically connected to the fixed-potential side electrode of the storage capacitor, and each pixel electrode is disposed at an upper-layer side of the shield layer, is formed using a plurality of interlayer insulating films as an underlying layer, and is electrically connected to a pixel-potential side electrode of the storage capacitor through a pixel-electrode contact hole integrally penetrating the plurality of interlayer insulating films.

21 Claims, 22 Drawing Sheets

ELECTRO-OPTICAL DEVICE, ELECTRONIC APPARATUS, AND METHOD OF MANUFACTURING ELECTRO-OPTICAL DEVICE

BACKGROUND

Exemplary embodiments of the present invention relate to an electro-optical device such as a liquid crystal display device, etc. and an electronic apparatus such as a liquid crystal projector, etc.

Related art electro-optical devices include pixel electrodes, scanning lines and data lines to selectively drive the pixel electrodes, and TFTs (Thin Film Transistor) as pixel-switching elements, so that it can be driven in an active matrix type. For the purpose of increasing contrast, storage capacitors may be provided between the TFTs and the pixel electrodes. The constituent elements described above are formed on a substrate with a high density, thereby addressing enhancement of an aperture ratio of pixels and decrease in size of the device, for example, see Related Art Document Japanese Patent Application Laid-open No. 2002-156652.

Accordingly, further increase in display quality or decrease in size and increase in accuracy is required for the electro-optical devices, and various countermeasures are prepared in addition to the above description. For example, when light is input to a semiconductor layer of a TFT, light leakage current is generated and thus the display quality is deteriorated, so that a light-shielding layer is provided around the semiconductor layer. It is preferable that the storage capacitors have a capacity as large as possible, but it is more preferably to design so as not to sacrifice a pixel aperture ratio. Most of the circuit elements are preferably provided on a substrate with a high density so as to decrease the size of the device.

SUMMARY

However, in the related art structure, the electrical connections of the lines, TFTs, pixel electrodes, etc. stacked with the interlayer insulating films therebetween, are accomplished through contact holes. The electrical connection is carried out in a path vertically passing through several layers of interlayer insulating films or is carried out in a path longitudinally crossing several layers of interlayer insulating films, depending upon places. However, since it is difficult to form the contact holes having such depth, a method of providing relay layers on proper interlayer insulating films and providing the contact holes step by step is employed. Accordingly, the following technical problems occur.

First, the contact holes connected to each other to cross the interlayer insulating films are formed at positions deviated from each other as seen two-dimensionally. Accordingly, since it is difficult to reduce the whole two-dimensional formation area for the connected contact holes, handling the decrease in pitch in the future is difficult. I this case, since the contact holes are deviated from each other in a plan view and in a cross-sectional view, light passing between the contact holes enters the TFTs, thereby causing light leakage current. When the contact holes are provided step by step with relay layers therebetween, the stacked structure on the substrate becomes complex and the number of processes is increased, so that the manufacturing efficiency or the yield may be decreased.

Exemplary embodiments of the present invention are contrived to address and/or solve the above discussed and/or other problems. Further, it is an object of exemplary embodiments of the present invention to provide an electro-optical device which can accomplish high-quality display as well as decrease in size and increase in accuracy with a simple structure, an electronic apparatus comprising the electro-optical device, and a method of manufacturing the electro-optical device with ease.

In order to address and/or solve the above discussed object, according to an exemplary aspect of the present invention, there is provided an electro-optical device including: a data line and a scanning line extending on a substrate to intersect each other; a thin film transistor disposed to correspond to an intersection between the data line and the scanning line on the substrate as two-dimensionally seen; a storage capacitor formed above the thin film transistor and having a fixed-potential side electrode and a pixel-potential side electrode oppositely disposed with a dielectric film therebetween; a plurality of interlayer insulating films disposed on the storage capacitor; a contact hole integrally penetrating the plurality of interlayer insulating films in a non-open area between pixels; a shield layer formed on the plurality of interlayer insulating films and made of a first conductive light-shielding film, which is electrically connected to the fixed-potential side electrode of the storage capacitor through the contact hole; and a pixel electrode formed on the interlayer insulating layer above the shield layer and electrically connected to the thin film transistor through the pixel-potential side electrode of the storage capacitor.

The electro-optical device according to exemplary embodiments of the present invention includes the scanning lines, the data lines, the thin film transistors, the storage capacitors, the shield layers, and the pixel electrodes. These elements are stacked on the substrate through the interlayer insulating films. By allowing a thin film transistor to apply a data signal to a pixel electrode at a pixel position selected by a scanning line from a data line, the electro-optical device can be driven in an active matrix type. By interposing the storage capacitor between the thin film transistor and the pixel electrode, a potential-holding characteristic of the pixel electrode is enhanced, so that it is possible to accomplish high-contrast display. In addition, since the shield layer having a light-shielding function and defining the non-open area of each pixel or shielding the semiconductor layer of the thin film transistor from light is electrically connected to the fixed-potential side electrode of the storage capacitor, the shield layer also has a function of a capacitor line.

The shield layer is formed on the plurality of interlayer insulating films disposed on the storage capacitor and in the non-open area as seen two-dimensionally. That is, the plurality of interlayer insulating films are stacked between the shield layer and the fixed-potential side electrode of the storage capacitor. The shield layer and the fixed-potential side electrode are electrically connected to each other through the contact hole integrally penetrating the plurality of interlayer insulating films.

The "contact hole" described here indicates a hole penetrating the interlayer insulating film in the thickness direction so as to electrically connect the conductive layers on and under the interlayer insulating film, and includes, for example, a case where the upper conductive layer drops inside the hole and comes in contact with the lower conductive layer (that is, a case of a so-called contact hole) or a case where the hole is filled with a conductive material, one end thereof comes in contact with the upper conductive layer, and the other end comes in contact with the lower conductive layer (that is, a case where the hole is formed as a plug).

In the related art, unlike exemplary embodiments of the present invention, the electrical connection between the shield layer and the fixed-potential side electrode may be accomplished, for example, by using a method of providing a relay layer between the interlayer insulating films and connecting the contact holes formed in the interlayer insulating films on and under the relay layer by use of the relay layer. However, since a plurality of contact holes has to be formed between the shield layer and the fixed-potential side electrode and thus the contact holes are positioned at different locations in a plan view and in a cross-sectional view, the whole formation area for all the contact holes is larger by several times than the formation area for a single contact hole. In addition, light passing between the contact holes may be incident to the TFT, thereby causing light leakage current.

In contrast, according to exemplary embodiments of the present invention, since a single contact hole integrally penetrates a plurality of interlayer insulating films and the electrical connection between the shield layer and the fixed-potential side electrode is accomplished, the formation area can be reduced, thereby allowing decrease in pitch. In addition, since only one contact hole is used, the leakage of light from the formation area can be reduced or prevented. That is, the contact hole has a light-shielding function in the lower-layer portion below the shield layer, so that it is possible to more surely intercept the light.

Therefore, in the electro-optical device according to exemplary embodiments of the present invention, the decrease in size and the increase in accuracy can be accomplished due to decrease in pitch, and the light leakage current can be reduced or prevented, thereby maintaining and enhancing display quality.

According to another exemplary aspect of the present invention, the electro-optical device may further include a second conductive light-shielding film disposed in the non-open area as two-dimensionally seen and disposed between the plurality of interlayer insulating films. The contact hole may penetrate an area where the second conductive light-shielding film is not formed in the non-open area as two-dimensionally seen, and the pixel electrode may be electrically connected to the pixel-potential side electrode through a part of the second conductive light-shielding film.

In this exemplary aspect, the second conductive light-shielding film is formed between the shield layer and the fixed-potential side electrode in a cross-sectional view. Accordingly, a light-shielding effect for the thin film transistor can be further enhanced. The area provided with the contact hole is limited to the area where the second conductive light-shielding film is not formed as seen two-dimensionally, but since only one contact hole is used, this requirement can be satisfied relatively easily. In other words, as seen two-dimensionally, it is possible to form one contact hole in the area while reducing the area where the second conductive light-shielding film is not formed.

On the other hand, the pixel electrode relays a part of the second conductive light-shielding film and is connected to the pixel-potential side electrode of the storage capacitor. In this way, by disposing the respective constituent elements with a high density, it is possible to accomplish increase in aperture ratio or decrease in pitch of the pixel.

In this exemplary aspect, the data line may be formed as a part of the second conductive light-shielding film. That is, the data line may be disposed on the interlayer insulating film on which the second conductive light-shielding film is formed and may be made of the same material as the second conductive light-shielding film.

By disposing the data line in this way, it is possible to accomplish efficient integration and to reduce or prevent the capacitive coupling between the data line and the pixel electrode. That is, the data line is disposed at the position opposite to the pixel electrode with the shield layer therebetween in a cross-sectional view. As described above, the shield layer connected to the fixed-potential side electrode also serves as an electromagnetic interference shielding layer, and thus the possibility that variation of potential is generated in the pixel electrode in response to the electrification of the data line is reduced. Therefore, it is possible to accomplish higher-quality display.

In another exemplary aspect of the electro-optical device according to exemplary embodiments of the present invention, one edge of the contact hole extends along one end of the thin film transistor as two-dimensionally seen.

According to this exemplary aspect, the contact hole shields the thin film transistor from light from the upside of the slope. Since the contact hole is interposed between the shield layer and the storage capacitor and shields the thin film transistor from light at the positions closer to the thin film transistor than other light-shielding films such as the first and second conductive light-shielding films, it is possible to effectively reduce or prevent the light leakage current and thus to maintain and enhance display quality.

In another exemplary aspect of the electro-optical device according to exemplary embodiments of the present invention, the contact hole is disposed such that at least a part thereof overlaps one end of the thin film transistor as two-dimensionally seen.

According to this exemplary aspect, at least a part of the contact hole shields the thin film transistor right above the thin film transistor. Accordingly, a part of the light irregularly reflected from the inside of the stacked structure is reduced or prevented from being input to the thin film transistor from the upside, so that it is possible to maintain and enhance display quality.

In another exemplary aspect of the electro-optical device according to exemplary embodiments of the present invention, the contact hole is disposed in parallel to the thin film transistor in the extension direction of the non-open area, and the width of the contact hole is equal to or greater than the length of a channel region (channel length) of the thin film transistor in the width direction of the non-open area.

According to this exemplary aspect, since the contact hole is right opposite to the whole thin film transistor in the extension direction of the non-open area as seen two-dimensionally, it is possible to effectively shield the thin film transistor from light by the side wall surface and the bottom surface thereof.

In another exemplary aspect of the electro-optical device according to exemplary embodiments of the present invention, the contact hole is formed as a plug.

According to this exemplary aspect, since the contact hole is formed as a plug, a hole having a small diameter is preferable because the inside thereof can be easily filled with a conductive material. Therefore, the formation area thereof as seen two-dimensionally can be reduced relatively easily, so that it is possible to decrease the pixel pitch. Specifically, by plugging the contact hole with the conductive light-shielding film, the light-shielding ability around the contact hole can be further enhanced.

In another exemplary aspect of the electro-optical device according to exemplary embodiments of the present invention, the contact hole has an aspect ratio of 1 or less.

Here, the aspect ratio of the contact hole is defined as a ratio of the depth of the contact hole to the width of the contact hole.

According to this exemplary aspect, the contact hole has the width of the bottom surface larger than the depth thereof. Since the depth of the contact hole is determined as the thickness of the interlayer insulating layers, this means that the contact hole has a relatively large diameter (for example, compared with other contact hole). The bottom surface of the contact hole is covered with a shield layer which is a light-shielding film, it is possible to reduce or prevent the leakage of light better by enlarging the area thereof, so that it is possible to enhance the light-shielding effect.

In the deep hole penetrating a plurality of layers such as the contact hole, the small hole diameter deteriorates the coverage of the conductive film formed inside the contact hole, so that discontinuous portions of the conductive film may be generated. However, when the aspect ratio is 1 or less, the coverage of the conductive film formed inside the contact hole is enhanced and thus the connection failure can be reduced or prevented.

In the exemplary aspect in which the aspect ratio of the contact hole is 1 or less, the contact hole may be filled with an underlying film formed on the shield layer, and the surface of the underlying film may be subjected to the planarization process.

According to this exemplary aspect, the contact hole is filled with the underlying layer. A relatively-large recessed portion due to the contact hole having a large diameter is formed on the surface of the underlying layer right after the formation thereof. Therefore, by removing the unevenness formed as described above using a planarization process such as a chemical mechanical polishing (CMP), a polishing process, etc., the surface of the underlying layer is planarized.

For example, in a case where an electro-optical material such as liquid crystal is interposed between the substrate having the aforementioned stacked structure and the counter substrate opposite to the substrate, since the substrate surface is flat, it is possible to reduce the possibility of unevenness generated in the alignment state of the electro-optical material, so that higher-quality display is possible.

According to another exemplary aspect of the present invention, there is provided an electro-optical device including: a data line and a scanning line extending on a substrate to intersect each other; a thin film transistor disposed to correspond to an intersection between the data line and the scanning line on the substrate as two-dimensionally seen; a storage capacitor formed above the thin film transistor and having a fixed-potential side electrode and a pixel-potential side electrode electrically connected to the thin film transistor, both electrodes being oppositely disposed with a dielectric film therebetween; a plurality of interlayer insulating films disposed on the storage capacitor; a shield layer made of a first conductive light-shielding film which is formed above the storage capacitor and between the plurality of interlayer insulating films in a non-open area between pixels as seen two-dimensionally and which is electrically connected to the fixed-potential side electrode; a pixel-electrode contact hole formed using the plurality of interlayer insulating films as an underlying layer and integrally penetrating the plurality of interlayer insulating films in an area where the shield layer does not exist in the non-open area as seen two-dimensionally; and a pixel electrode electrically connected to the pixel-potential side electrode of the storage capacitor through the pixel-electrode contact hole.

The electro-optical device according to exemplary embodiments of the present invention includes the scanning lines, the data lines, the thin film transistors, the storage capacitors, the shield layers, and the pixel electrodes. These elements are stacked on the substrate through the interlayer insulating films. By allowing a thin film transistor to apply a data signal to a pixel electrode at a pixel position selected by a scanning line from a data line, the electro-optical device can be driven in an active matrix type. By interposing the storage capacitor between the thin film transistor and the pixel electrode, a potential-holding characteristic of the pixel electrode is enhanced, so that it is possible to accomplish high contrast display. In addition, since the shield layer having a light-shielding function is electrically connected to the fixed-potential side electrode of the storage capacitor, the shield layer has also a function of a capacitor line.

The pixel electrode is disposed above the shield layer. Under the pixel electrode, a plurality of interlayer insulating films is stacked, and the pixel electrode is electrically connected to the pixel-potential side electrode of the storage capacitor through the pixel-electrode contact hole integrally penetrating the plurality of interlayer insulating films.

The "contact hole" described in exemplary embodiments of the present invention indicates a hole penetrating the interlayer insulating film in the thickness direction so as to electrically connect the conductive layers on and under the interlayer insulating film, and includes, for example, a case where the upper conductive layer drops inside the hole and comes in contact with the lower conductive layer (that is, a case of a so-called contact hole) or a case where the hole is filled with a conductive material, one end thereof comes in contact with the upper conductive layer, and the other end comes in contact with the lower conductive layer (that is, a case where the hole is formed as a plug).

In the related art, unlike exemplary embodiments of the present invention, the electrical connection between the shield layer and the fixed-potential side electrode may be accomplished, for example, by using a method of providing a relay layer between the interlayer insulating films and connecting the contact holes formed in the interlayer insulating films on and under the relay layer by use of the relay layer. However, since a plurality of contact holes have to be formed between the shield layer and the fixed-potential side electrode and thus the contact holes are positioned at different locations in a plan view and in a cross-sectional view, the whole formation area for all the contact holes is larger by several times than the formation area for a single contact hole.

In contrast, in exemplary embodiments of the present invention, since a single contact hole integrally penetrates a plurality of interlayer insulating films at the side of the shield layer, and the electrical connection between the shield layer and the fixed-potential side electrode is secured, the formation area for the contact hole can be reduced, thereby allowing decrease in pitch. In addition, since the contact hole is a single hole, it is possible to simplify the structure.

Therefore, according to the electro-optical device of exemplary embodiments of the present invention, it is possible to accomplish decrease in size and increase in accuracy with decrease in pitch, and the structure becomes simple, so that it is possible to easily manufacture the electro-optical device.

In another exemplary aspect of the electro-optical device according to exemplary embodiments of the present invention, the pixel-electrode contact hole extends in the extension direction of the non-open area as seen two-dimensionally.

According to this exemplary aspect, since the pixel-electrode contact hole has a shape extending in the extension direction of the non-open area, it is possible to secure the bottom area avoiding other contact holes. In the deep hole penetrating a plurality of layers like the pixel-electrode contact hole, a small hole diameter deteriorates the coverage of the conductive film formed inside the contact hole, so that discontinuous portions of the conductive film may be generated. However, in this exemplary aspect, since the pixel-electrode contact hole is increased in diameter at least in the extension direction of the non-open area, the connection failure can be reduced or prevented.

In another exemplary aspect of the electro-optical device according to exemplary embodiments of the present invention, the pixel-electrode contact hole is formed as a plug.

According to this exemplary aspect, since the inside is filled with a conductive material, the diameter of the pixel-electrode contact hole is decreased. Therefore, the formation area as seen two-dimensionally can be reduced relatively easily, so that it is possible to decrease the pixel pitch.

In another exemplary aspect of the electro-optical device according to exemplary embodiments of the present invention, the pixel-electrode contact hole has an aspect ratio of 1 or less.

Here, the aspect ratio of the contact hole is defined as a ratio of the depth of the contact hole to the width of the contact hole.

According to this exemplary aspect, the pixel-electrode contact hole has a width of the bottom surface larger than the depth thereof. Since the depth of the contact hole is determined as the thickness of the interlayer insulating layers, this consequently means that the pixel-electrode contact hole has a relatively large diameter (for example, compared with other contact hole). By increasing the area of the bottom surface of the pixel-electrode contact hole, it is possible to satisfactorily reduce or prevent the leakage of light, so that it is possible to enhance the light-shielding effect.

In the deep hole penetrating a plurality of layers like the pixel-electrode contact hole, the small hole diameter deteriorates the coverage of the conductive film formed inside the contact hole, so that discontinuous portions of the conductive film may be generated. However, in the pixel-electrode contact hole having an aspect ratio of 1 or less, the connection failure can be reduced or prevented, so that it is possible to more easily perform the opening process than a case where the hole diameter is small.

In another exemplary aspect according to exemplary embodiments of the present invention, the electro-optical device further includes a second conductive light-shielding film disposed between the shield layer and the fixed-potential side electrode and in the non-open area as seen two-dimensionally, and the pixel electrode is integrally connected to a part of the second conductive light-shielding film through the pixel-electrode contact hole.

According to this exemplary aspect, the second conductive light-shielding film is formed between the shield layer and the fixed-potential side electrode of the storage capacitor in a cross-sectional view. Therefore, it is possible to further enhance the light-shielding effect. The pixel electrode relays a part of the second conductive light-shielding film and is connected to the pixel-potential side electrode of the storage capacitor. By efficiently integrating the respective constituent elements, it is possible to enhance the aperture ratio or to decrease the pitch of a pixel.

In this exemplary aspect, the data line may be made of a part of the second conductive light-shielding film.

By disposing the data lines in this way, the efficient integration can be accomplished and the capacitive coupling between the data lines and the pixel electrodes can be reduced or prevented. That is, the data line is disposed at a position opposite to the pixel electrodes through the shield layer in a cross-sectional view. As described above, the shield layer connected to the fixed-potential side electrode serves as an electromagnetic interference shielding layer, so that the possibility of potential variation generated in the pixel electrode in response to the electrification of the data line is reduced. Therefore, it is possible to accomplish a higher-quality display.

In another exemplary aspect of the electro-optical device according to exemplary embodiments of the present invention, the shield layer is electrically connected to the fixed-potential side electrode through a shield-layer contact hole which is formed using one interlayer insulating film stacked below the shield layer among the plurality of interlayer insulating films and another interlayer insulating film disposed on the storage capacitor as underlying layers, and which integrally penetrates the one and another interlayer insulating films in an area where the second conductive light-shielding film does not exist in the non-open area as seen two-dimensionally. In this case, the one interlayer insulating film stacked below the shield layer is an interlayer insulating film included in the plurality of interlayer insulating films penetrated by the pixel-electrode contact hole, and the shield-layer contact hole is disposed closer to the thin film transistor than to the pixel-electrode contact hole.

According to this exemplary aspect, each of the pixel-electrode contact hole and the shield-layer contact hole is formed to penetrate a plurality of insulating layers. As a result, a labor of providing the contact holes in every interlayer insulating films or forming relay layers between the interlayer insulating films can be saved.

Specifically, in this case, the pixel-electrode contact hole is provided between the pixel electrode and the second conductive light-shielding film, and the shield-layer contact hole is provided between the shield layer and the fixed-potential side electrode through the second conductive light-shielding film. That is, the shield-layer contact hole penetrates (1) the interlayer insulating films disposed below the shield layer and on the second conductive light-shielding film reached by the pixel-electrode contact hole, and (2) the interlayer insulating films disposed below the second conductive light-shielding film and on the storage capacitor.

The contact holes are deviated vertically from each other. According to such deviation, in a case where the contact holes are provided step by step in every interlayer insulating film, the number of processes is reduced by simultaneously forming two contact holes corresponding to the pixel-electrode contact hole and the shield-layer contact hole in the common interlayer insulating films in a cross-sectional view. However, in this case, it is required to perform the hole forming process at least three times. On the contrary, in this exemplary aspect, the pixel electrode contact hole and the shield-layer contact hole may be simply opened, respectively, so that it is required to perform the hole forming process two times. Therefore, it is possible to reduce the number of processes.

In the exemplary aspect in which the shield-layer contact hole is provided, the shield-layer contact hole may be formed as a plug.

In this case, by forming the shield-layer contact hole as a plug having a small diameter, the formation area thereof is reduced two-dimensionally. As a result, a complex stacked structure can be easily formed and the pixel pitch can be further decreased. In addition, by forming the pixel-electrode contact hole as a plug also, it is possible to further decrease the pitch.

In the exemplary aspect in which the shield-layer contact hole is provided, the shield-layer contact hole may have an aspect ratio of 1 or less.

Since the shield-layer contact hole is filled with the shield layer, the shield-layer contact hole has a light-shielding function. In this case, since the bottom surface of the shield-layer contact hole is formed large, the leakage of light can be satisfactorily reduced or prevented, thereby enhancing the light-shielding effect. Specifically, since the bottom surface is positioned right on the storage capacitor as seen two-dimensionally and shields the thin film transistor at a closer position thereto than other light.-shielding films such as the shield layer, etc., it is possible to more surely reduce or prevent the light leakage current.

Since the shield-layer contact hole is formed shallow with an aspect ratio of 1 or less, the coverage of the conductive film formed inside the shield-layer contact hole is reduced or prevented from being deteriorated, so that it is possible to reduce or prevent the connection failure and to more easily form the holes than a case where the hole diameter is: small.

In order to address or accomplish the aforementioned object, according to another exemplary aspect of exemplary embodiments of the present invention, there is provided an electronic apparatus including the aforementioned electro-optical device (including various aspects thereof) according to exemplary embodiments of the present invention.

Since the electronic apparatus according to exemplary embodiments of the present invention includes the aforementioned electro-optical device according to exemplary embodiments of the present invention, it is possible to realize various electronic apparatuses such as a projection display apparatus, a liquid crystal television, a mobile phone, an electronic pocketbook, a word processor, a view finder type or monitor direct vision-type video tape recorder, a work station, a television phone, a POS terminal, a touch panel, and the like, which can display images with high quality. In addition, as the electronic apparatus according to exemplary embodiments of the present invention, an electrophoresis apparatus such as an electronic paper, etc. or a display apparatus (for example, a field emission display and a surface-conduction electron-emitter display) employing an electron emission element, etc. can be realized.

In order to address or accomplish the aforementioned object, according to another exemplary aspect of the present invention, there is provided a method of manufacturing an electro-optical device including a data line and a scanning line extending on a substrate to intersect each other, a thin film transistor disposed to correspond to an intersection between the data line and the scanning line, a storage capacitor formed above the thin film transistor which is electrically connected to a pixel-potential side electrode, a shield layer made of a first conductive light-shielding film formed above the storage capacitor and in a non-open area between pixels as seen two-dimensionally, and electrically connected to a fixed-potential side electrode of the storage capacitor, and a pixel electrode formed above the shield layer and electrically connected to the thin film transistor through the pixel-potential side electrode of the storage capacitor. The method includes the steps of: forming the thin film transistor in an area corresponding to an intersection between the data line and the scanning line on the substrate as seen two-dimensionally; forming the storage capacitor above the thin film transistor; stacking the plurality of interlayer insulating films on the storage capacitor with a second conductive light-shielding film connected to the pixel-potential side electrode of the storage capacitor therebetween; opening a shield-layer contact hole on the surface of the plurality of interlayer insulating films, so that the shield-layer contact hole integrally penetrates the plurality of interlayer insulating films in an area where the second conductive light-shielding film is not formed in the non-open area as seen two-dimensionally and reaches the fixed-potential side electrode of the storage capacitor; forming the shield layer on the surface of the interlayer insulating film in which the shield-layer contact hole is opened; forming an underlying layer, which is a base of the pixel electrode, on the shield layer; opening a pixel-electrode contact hole, which electrically connects the pixel electrode to a part of the second conductive light-shielding film, on the surface of the underlying layer, so that the pixel-electrode contact hole integrally penetrates a plurality of layers including the underlying layer and reaches the part of the second conductive light-shielding film; and forming the pixel electrode on the surface of the underlying layer in which the pixel-electrode contact hole is opened.

In the method of manufacturing an electro-optical device according to exemplary embodiments of the present invention, the thin film transistor, the storage capacitor, the second conductive light-shielding film, the shield layer, and the pixel electrode are stacked in this order on the substrate through the interlayer insulating films. The shield layer and the fixed-potential side electrode are electrically connected to each other through the shield-layer contact hole integrally penetrating a plurality of interlayer insulating films therebetween. The pixel electrode and the second conductive light-shielding film are electrically connected to each other through the pixel-electrode contact hole integrally penetrating a plurality of interlayer insulating films therebetween. The pixel electrode is relayed to the pixel-potential side electrode of the storage capacitor via the second conductive light-shielding film electrically connected to the pixel electrode through the pixel-electrode contact hole, and is electrically connected to the thin film transistor through the pixel-potential side electrode.

In this way, each of the pixel-electrode contact hole and the shield-layer contact hole is formed to integrally penetrate a plurality of interlayer insulating films. As a result, a labor for providing the contact holes in every interlayer insulating film or forming relay layers between the respective interlayer insulating films can be saved. Specifically, the contact holes are deviated vertically from each other from the structural point of view. In a case where the contact holes are provided step by step in every interlayer insulating film, the number of processes is reduced by simultaneously forming two contact holes corresponding to the pixel-electrode contact hole and the shield-layer contact hole in the common interlayer insulating films in a cross-sectional view. However, in this case, at least three times of hole forming process are required.

In contrast, in the method of manufacturing an electro-optical device according to exemplary embodiments of the present invention, the pixel-electrode contact hole and the shield-layer contact hole can be simply opened, respectively, and thus the hole forming process is performed two times. Therefore, the number of processes can be reduced and thus easy manufacturing is possible. By providing such contact holes, as described above, it is possible to manufacture an electro-optical device having a decreased size and an enhanced accuracy with decrease in pitch.

The operation and other advantages of exemplary embodiments of the present invention will be apparent from exemplary embodiments described below.

BRIEF DESCRIPTION OF THE DRAWINGS

FIG. 4 and FIG. 5 are overlapped;

FIG. 4 and FIG. 5 are overlapped;

FIG. 11 and FIG. 12 are overlapped;

FIG. 11 and FIG. 12 are overlapped;

DETAILED DESCRIPTION OF PREFERRED EMBODIMENTS

Now, exemplary embodiments of the present invention will be described with reference to the drawings. In the following exemplary embodiments, an electro-optical device according to exemplary embodiments of the present invention is applied to a liquid crystal display device.

1: First Exemplary Embodiment

First, a first exemplary embodiment of the electro-optical device according to exemplary embodiments of the present invention will be described with reference to FIGS. 1 to 7.

1-1: Entire Structure of Electro-Optical Device

Figure 1:
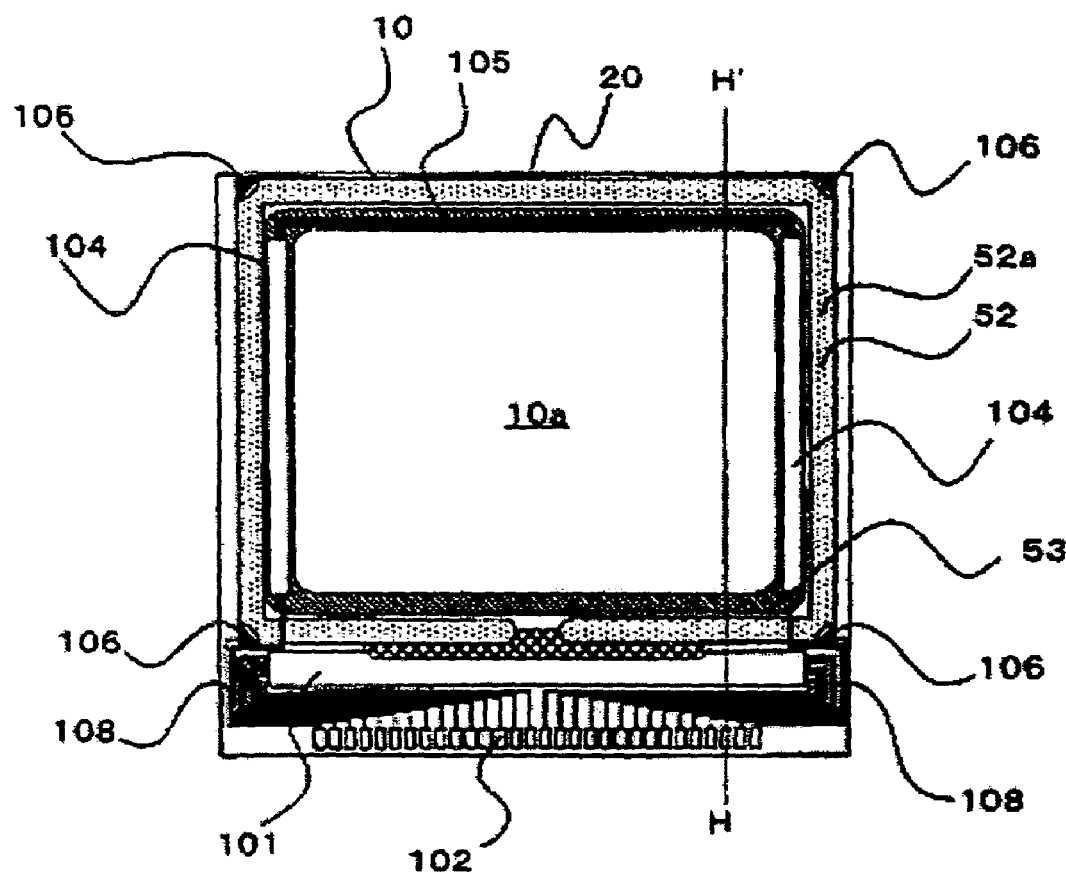
FIG. 1 is a schematic plan view illustrating the whole structure of an electro-optical device.

First, the whole structure of the electro-optical device according to this exemplary embodiment will be described with reference to FIGS. 1 and 2. FIG. 1 is a schematic plan view of the electro-optical device when a TFT array substrate together with the constituent elements formed thereon is seen from a counter substrate side, and FIG. 2 is a schematic cross-sectional view taken along Line H-H' of FIG. 1.

Figure 2:
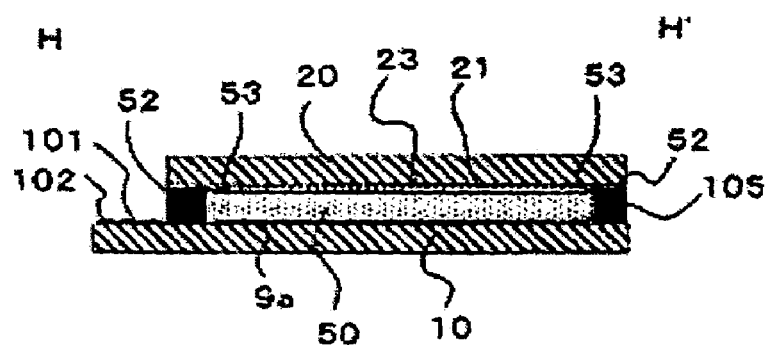
FIG. 2 is a schematic cross-sectional view taken along Line H-H' of FIG. 1.

In FIGS. 1 and 2, in the electro-optical device according to the present exemplary embodiment, a TFT array substrate 10 and a counter substrate 20 are disposed to be opposite to each other. A liquid crystal layer 50 is interposed between the TFT array substrate 10 and the counter substrate 20, and the TFT array substrate 10 and the counter substrate 20 are bonded to each other through a seal member 52 provided in a seal area positioned around an image display area 10a.

The seal member 52 is made of, for example, an ultraviolet resin, a thermosetting resin, etc. for bonding both substrates, and is coated on the TFT array substrate 10 in the manufacturing process and is cured through application of ultraviolet ray, heating, etc. In the seal member 52, a gap material such as glass fiber or glass beads for setting a gap (inter-substrate gap) between the TFT array substrate 10 and the counter substrate 20 to a predetermined value is dispersed. That is, the electro-optical device according to the present exemplary embodiment is used for a light valve of a projector, is small in size, and is suitable for performing enlargement display.

On the counter substrate 20, an opaque frame light-shielding film 53 defining a frame area of the image display area 10a is provided in parallel to the inside of a seal area in which the seal member 52 is disposed. However, all or a part of the frame light-shielding film 53 may be provided as a built-in light-shielding film at the side of the TFT array substrate 10.

Outside an area where the seal member 52 is disposed in a peripheral area positioned around the image display area 10a, a data-line driving circuit 101 and external connection terminals 102 are provided along one side of the TFT array substrate 10. Scanning-line driving circuits 104 are provided along two sides adjacent to the one side and are covered with the frame light-shielding film 53. In order to connect the two scanning-line driving circuit 104 provided at both sides of the image display area 10a, a plurality of wires 105 are provided along the other side of the TFT array substrate 10 and is covered with the frame light-shielding film 53.

Up-down connection members 106 serving as up-down connection terminals between both substrates are disposed at four corner portions of the counter substrate 20. On the other hand, on the TFT array substrate 10, up-down connection terminals are provided in the areas opposite to the corner portions. As a result, the TFT array substrate 10 and the counter substrate 20 can be electrically connected to each other.

In FIG. 2, on the TFT array substrate 10, pixel electrodes 9a are formed on pixel-switching TFTs or various wires and an alignment film is formed thereon. On the other hand, on the counter substrate 20, in addition to the counter electrode 21, a light-shielding film 23 of a lattice shape or a stripe shape is formed, and an alignment film is formed thereon. The liquid crystal layer 50 is made of one kind of nematic liquid crystal or liquid crystal in which various kinds of nematic liquid crystal are mixed, and has a predetermined alignment state between the pair of alignment films.

In addition to the data-line driving circuit 101, the scanning-line driving circuits 104, etc., a sampling circuit sampling image signals of image signal lines and supplying the sampled image signals to the data lines, a precharge circuit supplying precharge signals of a predetermined level to a plurality of data lines prior to the image signals, respectively, an inspection circuit for inspecting quality, defects, etc. of the electro-optical device during the manufacturing process or at the time of loading, etc. may be formed on the TFT array substrate 10.

1-2: Structure of Image Display Area

Next, a structure of the image display area of the electro-optical device according to the present exemplary embodiment will be described with reference to FIGS. 3 to 7.

Figure 3:
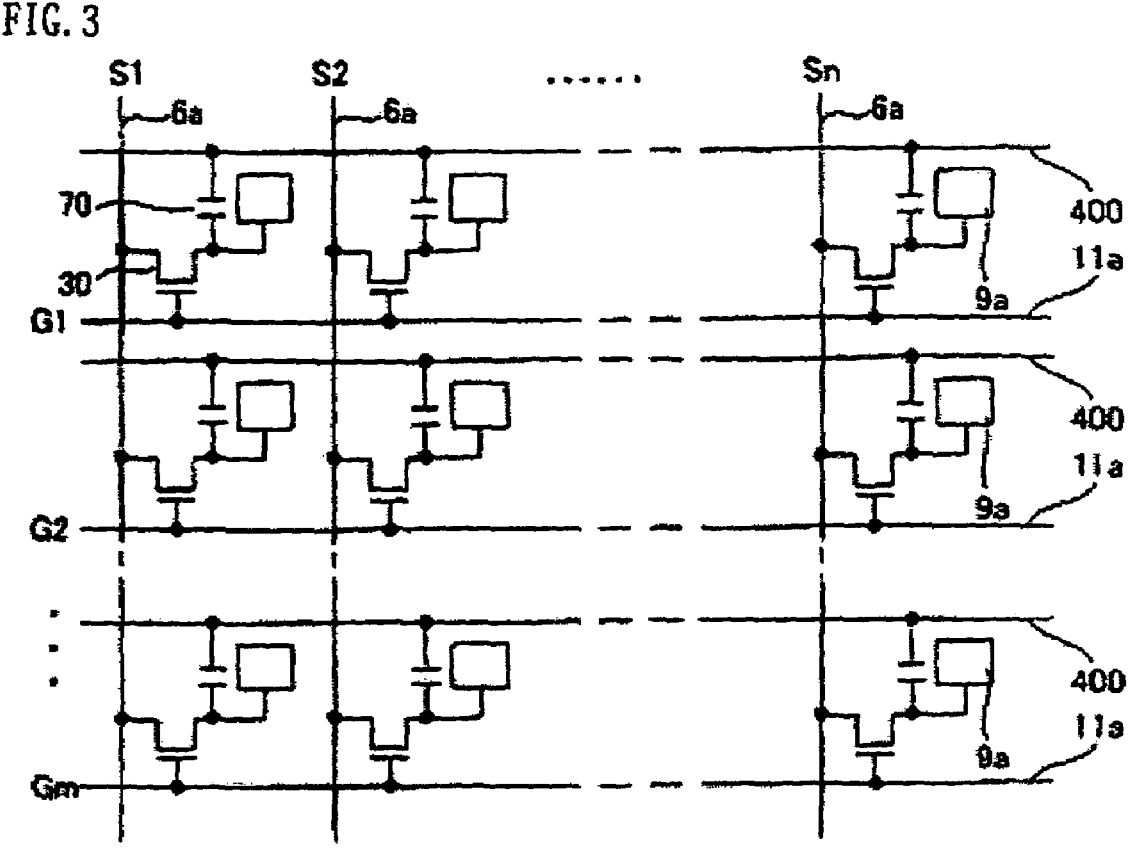
FIG. 3 is a schematic equivalent circuit diagram of various elements, wires, etc. in a plurality of pixel portions formed in a matrix shape and constituting an image display area of the electro-optical device.
Figure 4:
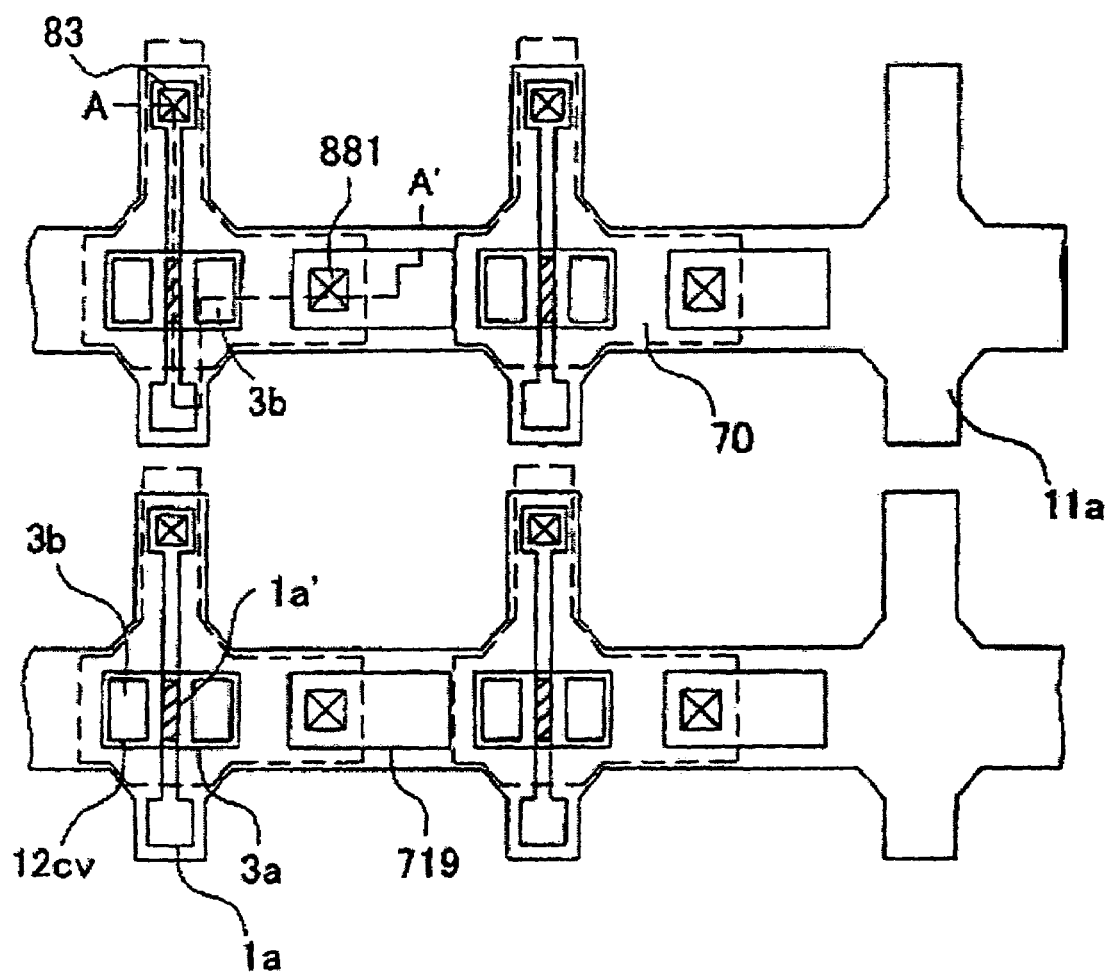
FIG. 4 is a schematic plan view illustrating pixels on a TFT array substrate according to a first exemplary embodiment, where only a structure of a lower-layer portion (a portion corresponding to lower layers reaching a reference numeral 70 (storage capacitor) in FIG. 7) is shown.
Figure 5:
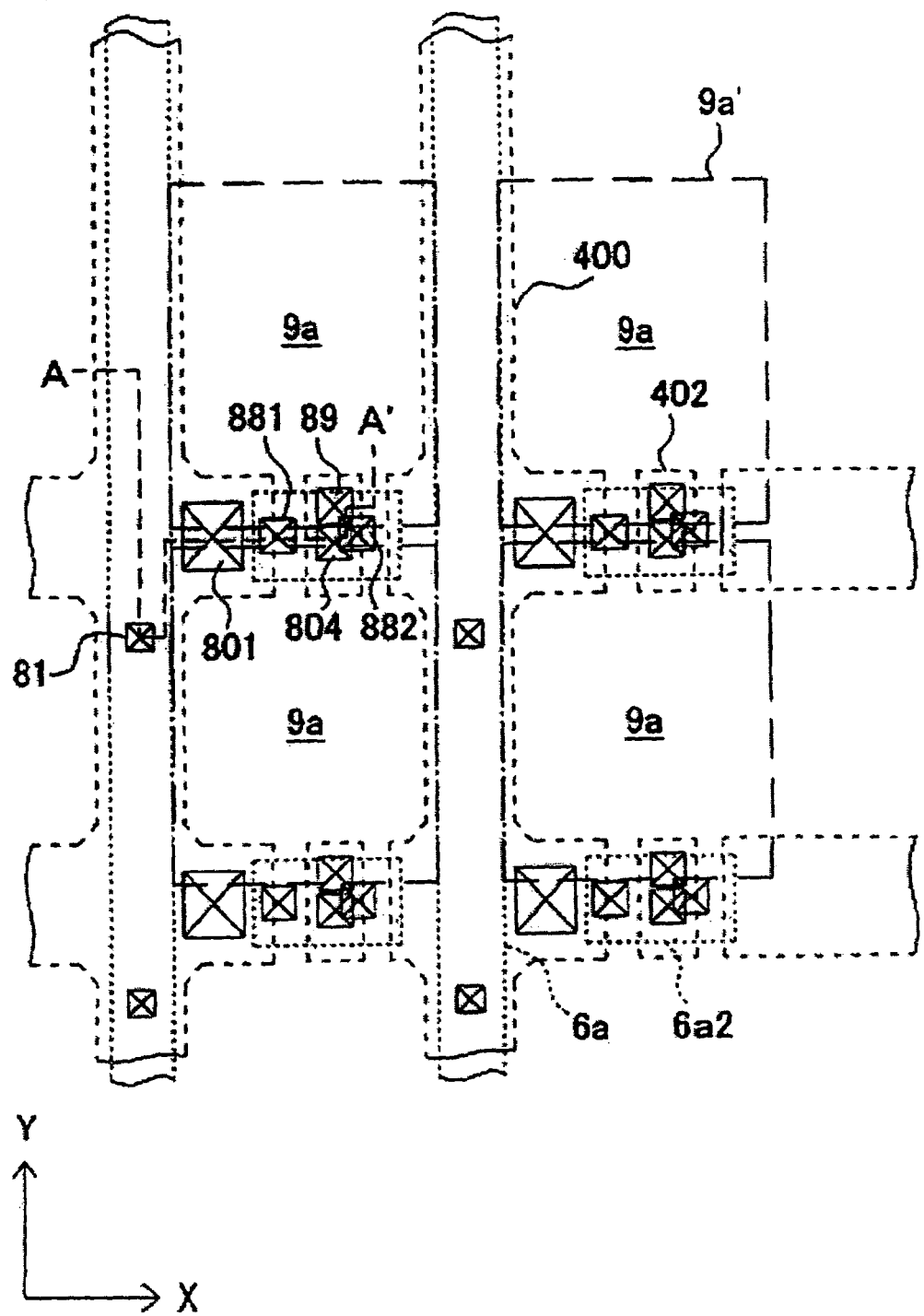
FIG. 5 is a schematic plan view illustrating pixels on the TFT array substrate according to the first exemplary embodiment, where only a structure of an upper-layer portion (a portion corresponding to upper layers positioned above the reference numeral 70 (storage capacitor) in FIG. 7) is shown.
Figure 6:
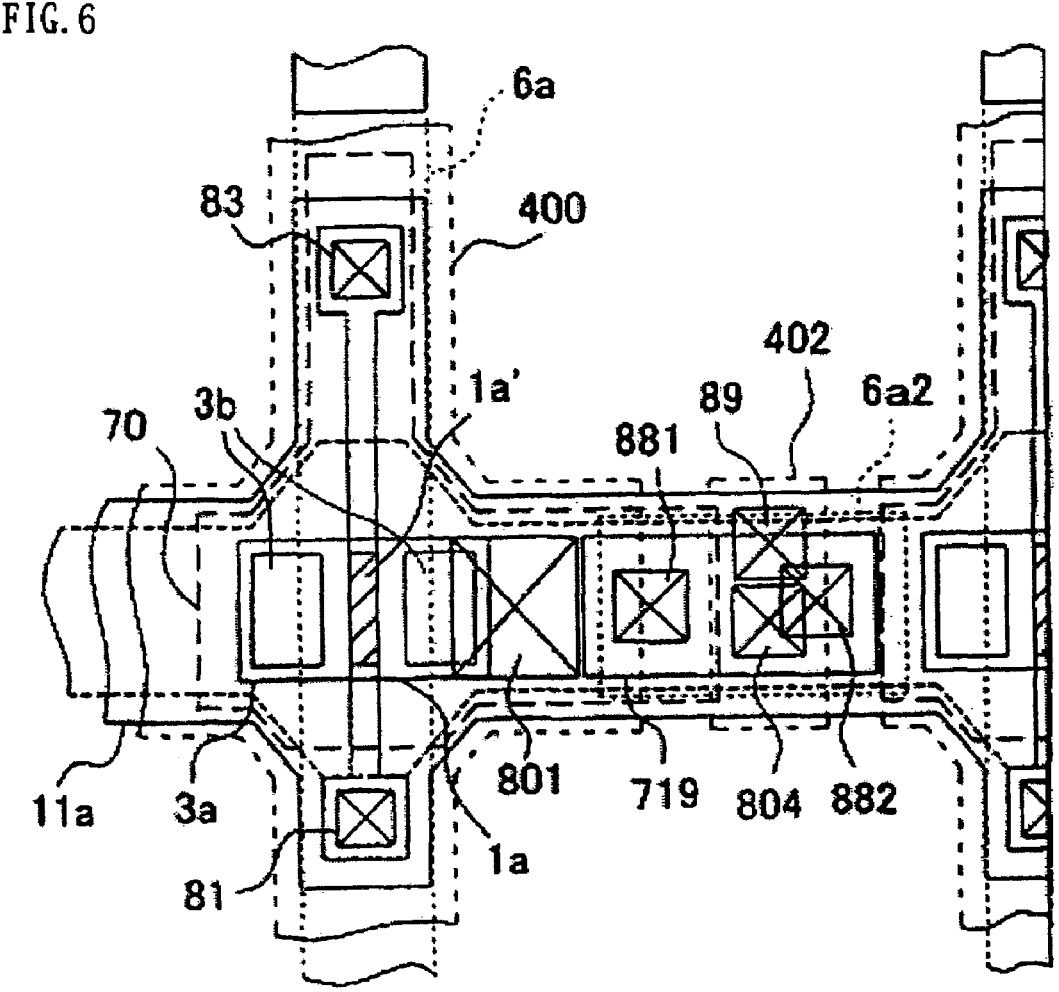
FIG. 6 is a partially-enlarged schematic plan view illustrating a case where
Figure 7:
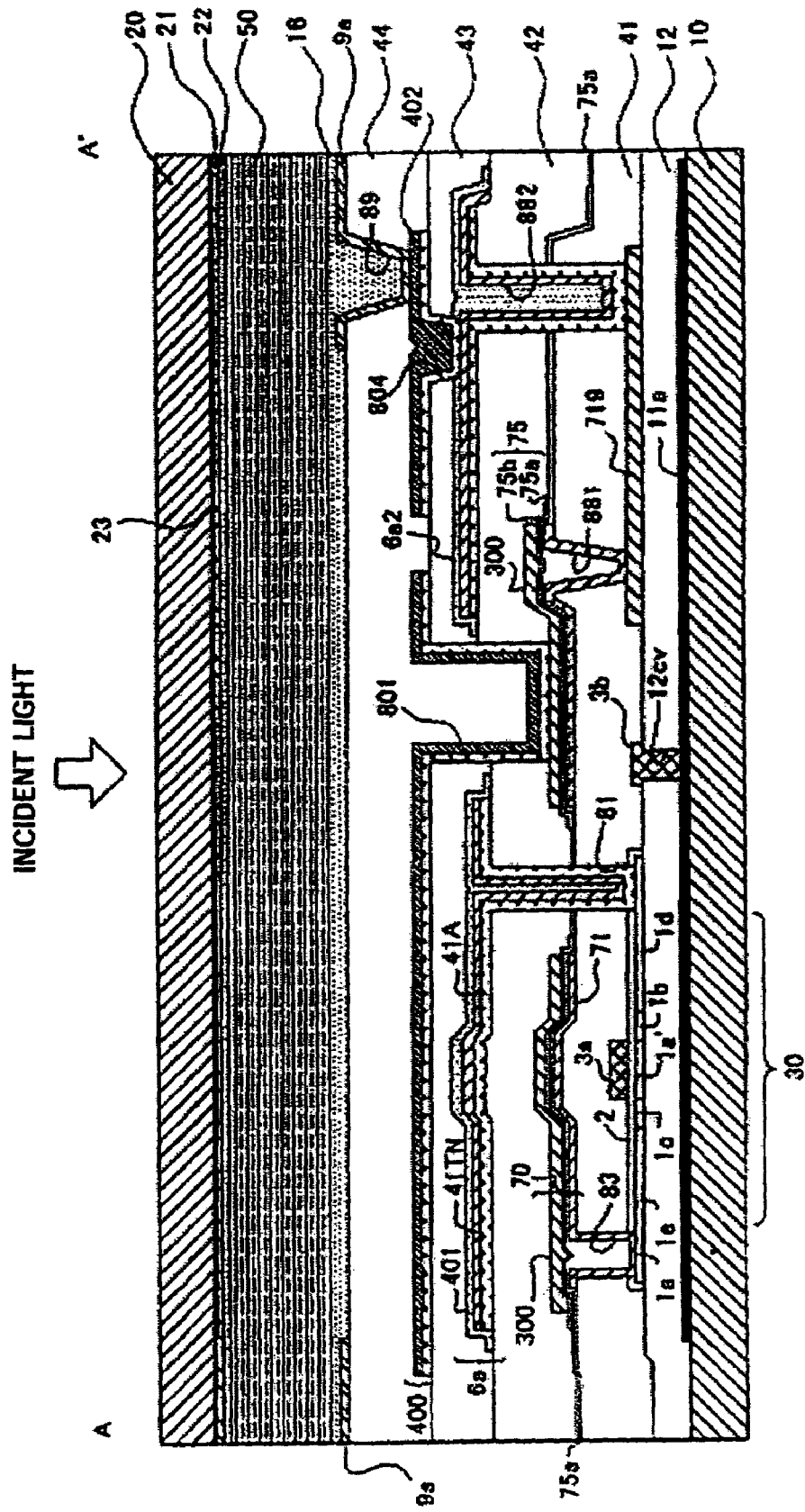
FIG. 7 is a schematic cross-sectional view taken along Line A-A' in the case where

FIG. 3 shows an equivalent circuit of pixel portions in the electro-optical device according to the present exemplary embodiment. FIGS. 4 to 6 are schematic plan views illustrating partial structures of the pixel portions on the TFT array substrate. FIGS. 4 and 5 correspond to a lower-layer portion (FIG. 4) and an upper-layer portion (FIG. 5) of a stacked structure described later, respectively. FIG. 6 is an enlarged schematic plan view of the stacked structure, and is shown as overlapping FIG. 4 and FIG. 5 with each other. FIG. 7 is a schematic cross-sectional view taken along Line A-A' when FIG. 4 and FIG. 5 overlap each other. In FIG. 7, in order to make respective layers and members in the figure be recognized, scale ratios of the respective layers and members are changed properly.

1-2-1: Theoretical Structure of Pixel Portion

As shown in FIG. 3, in the image display area 10a, a plurality of scanning lines 11a and a plurality of data lines 6a are arranged to intersect each other and pixel portions, which are selected by the respective scanning lines 11a and the respective data lines 6a, are provided between the lines. A TFT 30, a pixel electrode 9a, and a storage capacitor 70 are provided at each pixel portion. The TFT 30 is provided to apply the image signals S1, S2, . . . , Sn supplied from the data lines 6a to selected pixels. The gate is connected to the scanning line 11a, the source is connected to the data line 6a, and the drain is connected to the pixel electrode 9a. The pixel electrode 9a forms a liquid crystal capacitor together with a counter electrode 21 to be described later, and supplies the input image signals S1, S2, . . . , Sn to the pixel portion to allow the pixel portion to hold the image signals for a predetermined time. One electrode of the storage capacitor 70 is connected to the drain of the TFT 30 in parallel to the pixel electrode 9a, and the other electrode is connected to a capacitor line 400 having a fixed potential, thereby holding a fixed potential.

The electro-optical device employs, for example, a TFT active driving method, and line-sequentially applies scanning signals G1, G2, . . . to the respective scanning lines 11a through the scanning-line driving circuits 104 (see FIG. 1). As a result, the image signals S1, S2, . . . , Sn from the data-line driving circuit 101 (see FIG. 1) are applied to the columns of the selected pixel portions in a horizontal direction, of which the TFT 30 is turned on, through the data lines 6a. At this time, the image signals S1, S2, . . . , Sn may be line-sequentially supplied to the data lines 6a and may be supplied to a plurality of data lines 6a (for example, in a unit of groups) at the same timing. Accordingly, the image signals are supplied to the pixel electrodes 9a corresponding to the selected pixels. Since the TFT array substrate 10 is disposed to be opposite to the counter substrate 20 with the liquid crystal layer 50 therebetween (see FIG. 2), the quantities of light passing between both substrates are controlled every pixel area by applying an electric field to the liquid crystal layer 50 every pixel area partitioned and arranged in this way, so that images can be displayed in gray scale. At this time, the image signals held by the respective pixel areas are reduced or prevented from leakage thereof by the storage capacitors 70.

1-2-2: Specific Structure of Pixel portion

Next, a specific structure of a pixel portion for performing the aforementioned operation will be described with reference to FIGS. 4 to 7.

In FIGS. 4 to 7, the respective circuit elements of the aforementioned pixel portion are constructed on the TFT array substrate 10 as conductive films patterned and stacked. The TFT array substrate 10 is made of, for example, a glass substrate, a quartz substrate, an SOI substrate, a semiconductor substrate, etc., and is disposed to be opposite to the counter substrate 20 made of, for example, a glass substrate or a quartz substrate. The respective circuit elements include, sequentially from the bottom, a first layer including the scanning line 11a, a second layer including the gate electrode 3a, a third layer including a fixed-potential side capacitor electrode of the storage capacitor 70, a fourth layer including the data line 6a, etc., a fifth layer including the capacitor line 400, etc., and a sixth layer including the pixel electrode 9a, etc. An underlying insulating film 12 is provided between the first and second layers, a first interlayer insulating film 41 is provided between the second and third layers, a second interlayer insulating film 42 is provided between the third and fourth layers, a third interlayer insulating film 43 is provided between the fourth and fifth layers, and a fourth interlayer insulating film 44 is provided between the fifth and sixth layers, respectively, thereby reducing or preventing the respective elements from being short-circuited. The first to third layers are shown as the lower-layer portion in FIG. 4 and the fourth to sixth layers are shown as the upper-layer portion in FIG. 5.

(Structure of First Layer—Scanning Line, etc.)

The first layer includes the scanning lines 11a. Each scanning line 11a is patterned in a shape having a main line portion extending in the X direction of FIG. 4 and a projection portion extending in the Y direction of FIG. 4 in which the data lines 6a or the capacitor lines 400 extend). The scanning line 11a is made of, for example, conductive poly-silicon, and, in addition, may be made of a single metal, an alloy, a metal silicide, a poly silicide, or a stacked body thereof, including at least one of high melting-point metals such as titanium (Ti), Chromium (Cr), tungsten (W), tantalum (Ta), molybdenum (Mo), etc.

(Structure of Second Layer—TFT, etc.)

The second layer includes the TFTs 30 and relay electrodes 719. Each TFT 30 has, for example, an LDD (Lightly Doped Drain) structure, and includes a gate electrode 3a, a semiconductor layer 1a, and an insulating film 2 a gate insulating film for electrically separating the gate electrode 3a and the semiconductor layer 1a. The gate electrode 3a is made of, for example, conductive poly-silicon. The semiconductor layer 1a is made of, for example, poly-silicon, and includes a channel region 1a', a low-concentration source region 1b, a low-concentration drain region 1c, a high-concentration source region 1d, and a high-concentration drain region 1e. The TFT 30 preferably has an LDD structure, but may have an off-set structure in which impurities are not injected into the low-concentration source region 1b and the low-concentration drain region 1c, and may have a self-aligned structure in which the high-concentration source region and the high-concentration drain region are formed by injecting impurities using the gate electrode 3a as a mask. The relay electrode 719 is made of, for example, the same film as the gate electrode 3a.

The gate electrode 3a of each TFT 30 is electrically connected to the scanning line 11a through a contact hole 12cv formed in the underlying insulating film 12. The underlying insulating film 12 is made of, for example, a silicon oxide film, and has a function reducing or preventing variation in element characteristic of the TFT 30 resulting from roughness or contamination due to polishing the substrate surface by covering the whole surface of the TFT array substrate 10, as well as a function electrically separating the first and second layers.

(Structure of Third Layer—Storage Capacitor, etc.)

The third layer includes the storage capacitors 70, etc. Each storage capacitor 70 has a structure in which a capacitor electrode (a fixed-potential side electrode of the storage capacitor) 300 and a lower electrode (a pixel-potential side electrode of the storage capacitor) 71 are disposed to be opposite to each other with a dielectric film 75 therebetween. The capacitor electrode 300 is electrically connected to the capacitor line 400. The lower electrode 71 is electrically connected to the high-concentration drain region 1e of the TFT 30 and the pixel electrode 9a, respectively.

The lower electrode 71 and the high-concentration drain region 1e are connected to each other through a contact hole 83 opened in the first interlayer insulating film 41. The lower electrode 71 and the pixel electrode 9a are electrically connected to each other through a path formed by allowing contact holes 881, 882, 804, and 89 to relay the respective layers of the relay electrode 719, a second relay electrode 6a2 (second conductive light-shielding film), and a third relay electrode 402.

The capacitor electrode 300 is made of, for example, a single metal, an alloy, a metal silicide, a poly silicide, a stacked body thereof, including at least one of high melting-point metals such as Ti, Cr, W, Ta, Mo, etc., or preferably tungsten silicide. Accordingly, the capacitor electrode has a function intercepting light to be incident on the TFT 30 from the upside. The lower electrode 71 is made of, for example, conductive poly-silicon.

The dielectric film 75 is made of, for example, a silicon oxide film such as an HTO (High Temperature Oxide) film, an LTO (Low temperature Oxide) film, etc., or a silicon nitride film, etc., which has a relatively thin thickness of about 5 to 200 nm.

The first interlayer insulating film 41 is made of, for example, NSG (Non Silicate Glass). In addition, the interlayer insulating film 41 may be made of silicate glass such as PSG (Phospho Silicate Glass), BSG (Boro Silicate Glass), BPSG (Boro Phospho Silicate Glass), etc., silicon nitride, silicon oxide, etc.

In this case, as can be seen from the schematic plan view of FIG. 4, since the storage capacitor 70 is formed such that it should not reach a pixel-opening area approximately corresponding to an area where the pixel electrode 9a would be formed (such that it is received in a non-open area), the aperture ratio of a pixel is kept relatively great.

(Structure of Fourth Layer—Data Line, etc.)

The fourth layer includes the data lines 6a. Each data line 6a is made of a three-layer film having aluminum, titanium nitride, and silicon nitride sequentially from the downside. The silicon nitride layer is patterned in a slightly greater size to cover the aluminum layer and the titanium nitride layer which are the lower layers thereof. In the fourth layer, the second relay electrode (second conductive light-shielding film) 6a2 is made of the same film as the data line 6a. These layers are formed to be separated from each other, as shown in FIG. 5.

Among them, the data line 6a is electrically connected to the high-concentration source region 1d of the TFT 30 through the contact hole 81 penetrating the first interlayer insulating film 41 and the second interlayer insulating film 42. The second relay electrode 6a2 is electrically connected to the relay electrode 719 through the contact hole 882 penetrating the first interlayer insulating film 41 and the second interlayer insulating film 42, as described above. The second interlayer insulating film 42 can be made of silicate glass such as NSG, BSG, BPSG, etc., silicon nitride, silicon oxide, etc.

(Structure of Fifth Layer—Capacitor line, etc.)

The fifth layer includes the capacitor lines 400 and the third relay electrodes 402. Each capacitor line 400 is a specific example of a "shield layer" according to exemplary embodiments of the present invention, and has a function electromagnetically shielding the pixel electrode 9a from interconnections such as the data line 6a below it. Each capacitor line 400 extends to around the image display area 10a and is electrically connected to a constant potential source, thereby holding a constant potential. As shown in FIG. 5, the capacitor lines 400 are formed in a lattice shape extending in the Y direction (a length direction of the channel region 1a' (channel-length direction)) and the X direction (a direction perpendicular to the channel-length direction), and the portions thereof extending in the X direction are cut and separated. The third relay electrodes 402 are provided in an island shape between the cut patterns of the capacitor lines 400. The capacitor lines 400 are formed with a width broader than those of the data lines 6a, the scanning lines 11a, and the TFTs 30, so as to cover the circuit elements. That is, the capacitor lines 400 are formed broader than the data lines 6a and the scanning lines 11a in the respective width directions thereof. Accordingly, the respective circuit elements are shielded from light and reflect the incident light from the counter substrate 20 side, thereby reducing or preventing a bad influence that outlines of the pixels become faint in projected images. In addition, the capacitor lines 400 have, for example, a two-layer structure formed by stacking aluminum and titanium nitride.

Corner portions in which the portions extending in the X direction and the portions extending in the Y direction of the capacitor lines 400 are accurately intersected have a shape that a shielded portion is slightly protruded (a rounded shape). Interception of light to the semiconductor layer 1a of the TFT 30 can be effectively accomplished by the shielded portion. That is, since the shielded portion reflects or absorbs the light incident to the semiconductor layer 1a from the upside of the slope, light leakage current in the TFT 30 is suppressed, so that it is possible to display high-quality images without flickering.

The capacitor line 400 constituting an example of the "shield layer" according to exemplary embodiments of the present invention is electrically connected to the capacitor electrode 300 of the storage capacitor 70, which is an example of the "pixel-potential side electrode" according to exemplary embodiments of the present invention, through the contact hole 801 integrally penetrating the third interlayer insulating film 43 and the second interlayer insulating film 42. Since the contact hole 801 is filled with the capacitor line 400, the bottom surface and the side wall surface thereof reflects or absorbs the light. In addition, as shown in FIG. 6, the contact hole 801 is disposed to extend in parallel to the TFT 30 in the extension direction (that is, the X direction of FIG. 6) of the non-open area and to partially overlap an end of the TFT 30. The hole diameter of the contact hole 801 is large and the width in the channel length direction of the hole diameter is equal to or greater than the length of the channel region 1a (channel length) of the TFT 30. In addition, as shown in FIG. 7, the bottom surface of the contact hole 801 is positioned in the third layer and the contact hole is closer to the semiconductor layer 1a than other light-shielding layers such as the capacitor line 400. Therefore, it is possible to more surely shield the TFT 30, specifically, the semiconductor layer 1a.

That is, the side wall surface of the contact hole 801 serves as a partition having a height of from the interlayer insulating film 42 to the interlayer insulating film 43, thereby excellently intercepting the light incident to the TFT 30 from the upside of the slope. The bottom surface having a larger width can also shield the TFT 30 from the light.

However, since it is considered that it is relatively difficult to etch the depth from the third interlayer insulating film 43 to the second interlayer insulating film 42, a method that a relay layer is provided on the second interlayer insulating film 42 and the contact holes formed in the respective interlayer insulating films are connected to each other through the relay layer to be perpendicular to the layer plane is employed. However, when the pixel portion is decreased in pitch, the size of the formation area is more important than the depths of the contact holes. That is, since the contact holes cannot be formed to overlap each other at one position as two-dimensionally seen (for example, see the contact holes 882, 804, and 89 in FIGS. 6 and 7), the contact holes are provided at positions different from each other. Therefore, since it is necessary to secure a margin area around the respective contact holes, the whole formation area of the contact holes are thus increased. As can be seen from FIG. 7, the contact hole connecting the capacitor line 400 to the storage electrode 300 must be provided to pass through the gap between the data line 6a and the second relay electrode 6a2, but if the gap is narrowed due to decrease in pitch, it is difficult to form the contact hole having the above structure. The inventors of exemplary embodiments of the present invention found out that when the pixel pitch is about 10 µm, the formation area for the contact hole is not sufficiently secured.

In contrast, in the present exemplary embodiment, the capacitor line 400 and the storage electrode 300 are connected using only the contact hole 801. The formation area for the contact hole 801 is greater than that of other contact holes, but is equal to or less than that of the related art structure.

In the related art structure, light may be leaked from the gap between the contact holes to the TFT 30, thereby causing the light leakage current. On the contrary, in the present exemplary embodiment, as shown in FIG. 7, the contact hole 801 intercepts the light inputting from the upside of the slope, thereby reducing or preventing the leakage of light to the TFT 30 side.

Here, the aspect ratio, that is, the ratio of the depth to the width, of the contact hole 801 is set to 1 or less. Generally, when a contact hole has a large depth (that is, when the aspect ratio is 1 or more), the formation of inner lines using a sputtering method can deteriorate the coverage inside the contact hole, thereby generating discontinuous portions. However, since the contact hole 801 has a large diameter, such connection failure can be reduced or prevented, so that it is possible to more easily perform the opening, compared with a case where the diameter is small.

In the fifth layer, the third relay electrode 402 is made of the same film as the capacitor line 400. As described above, the third relay electrode 402 relays the second relay electrode 6a2 and the pixel electrode 9a through the contact hole 804 and the contact hole 89.

Under the fifth layer, the third interlayer insulating film 43 is formed on the whole surface. The third interlayer insulating film 43 can be made of silicate glass such as NSG, PSG, BSG, BPSG, etc., silicon nitride, silicon oxide, etc.

(Structure of Sixth Layer—Pixel Electrode, etc.)

The fourth interlayer insulating film 44 is formed on the whole surface of the fifth layer, and the pixel electrodes 9a are formed thereon as the sixth layer. The contact hole 89 for electrically connecting the pixel electrode 9a and the third relay electrode 402 is opened in the fourth interlayer insulating film 44. The fourth interlayer insulating film 44 may be made of silicate glass such as NSG, PSG, BSG, BPSG, etc., silicon nitride, silicon oxide, etc.

Since the fourth interlayer insulating film 44 is formed on the contact hole 801 having a large diameter, the surface right after the formation of the fourth interlayer insulating film may be recessed right on the contact hole 801. However, in the present exemplary embodiment, the fourth interlayer insulating film 44 is formed thick in advance and the surface thereof is subjected to the planarization process such as a CMP process. In the CMP process, the chemical and mechanical polishing is performed by allowing the substrate surface to rotationally come in contact with a polishing pad fixed onto a polishing plate while supplying liquid-state slurry (chemical polishing liquid) including silica particles. An example of another planarization process can include a mechanical polishing process, etc. The surface of the fourth interlayer insulating film 44 is planarized through such a process, and thus unevenness of liquid crystal alignment in the liquid crystal layer 50 is reduced or prevented, thereby allowing high-quality images to be displayed.

The pixel electrodes 9a (of which the outlines are indicated by a dotted line 9a' in FIG. 5) are disposed at the pixel areas which are partitioned and arranged laterally and longitudinally, and the data lines 6a and the scanning lines 11a are arranged in a lattice shape on the boundaries thereof (see FIGS. 4 and 5). The pixel electrodes 9a are made of a transparent conductive film such as ITO (Indium Tin oxide), etc. The alignment film 16 is formed on the pixel electrodes 9a. Hitherto, the structure of the pixel portions on the TFT array substrate 10 is described.

On the other hand, the counter electrode 21 is provided on the whole opposite surface of the counter substrate 20 and the alignment film 22 is provided thereon (under the counter electrode 21 in FIG. 6). The counter electrode 21 is made of a transparent conductive film such as ITO, etc., similarly to the pixel electrode 9a. In order to reduce or prevent the light leakage current from being generated in the TFTs 30, the light-shielding film 23 is provided between the counter substrate 20 and the counter electrode 21 to cover at least the area right opposite to the TFTs 30.

The liquid crystal layer 50 is interposed between the TFT array substrate 10 and the counter substrate 20 constructed as described above. The liquid crystal layer 50 is formed by injecting liquid crystal into a space formed by sealing the circumferential edges of the substrates 10 and 20 with a seal member. The liquid crystal layer 50 has a predetermined alignment state by means of the alignment film 16 and the alignment film 22 having been subjected to an alignment process such as a rubbing process, etc., in a state where an electric field is not applied between the pixel electrodes 9a and the counter electrode 21.

The structure of a pixel portion described above is common to the respective pixel portions, as shown in FIGS. 4 and 5. Such pixel portions are periodically formed in the aforementioned image display area 10a (see FIG. 1). On the other hand, in the electro-optical device, as described with reference to FIGS. 1 and 2, driving circuits such as the scanning-line driving circuits 104, the data-line driving circuit 101, etc. are provided in the peripheral areas around the image display area 10a.

In the present exemplary embodiment described above, since the capacitor line 400 and the capacitor electrode 300 of the storage capacitor 70 opposite to each other with the interlayer insulating films 42 and 43 are integrally connected to each other through the contact hole 801, that is, since a single contact hole penetrates a plurality of interlayer insulating films and is positioned closely to the TFT 30, and the side surface of the contact hole in the thickness direction of the interlayer insulating films is coated with an electrode, (1) it is possible to intercept the light from the upside of the TFT 30. Specifically, since the contact hole 801 is closer to the semiconductor layer 1a than other layers having the light-shielding function, such as the capacitor line 400, etc., it is possible to more surely intercept the light. Therefore, the light leakage current is reduced or prevented, thereby enabling high-quality display. In addition, (2) the formation area for the contact hole can be reduced, thereby enabling decrease in pitch. As a result, it is possible to accomplish decrease in size and increase in accuracy of the device.

Since the contact hole 801 has the same width as the TFT 30, the TFT 30, specifically, the semiconductor layer 1a, can be shielded from the light due to the side wall surface and the bottom surface. Since the shape of the contact hole has an aspect ratio of 1 or less, it is possible to enhance the light-shielding effect due to the wide bottom surface.

2: Second Exemplary Embodiment

Next, a second exemplary embodiment of the present invention will be described. In the present exemplary embodiment, instead of the contact hole 801 in the first exemplary embodiment, a plug 802 filled in the contact hole connects the capacitor line 400 and the capacitor electrode 300 of the storage capacitor 70. Correspondingly to this, instead of the contact hole 804, a plug 805 is provided inside the contact hole. Here, the plug means a metal structure of, for example, a pillar shape (a spicula shape) which is filled with metal: such as titanium (Ti), chromium Cr, tungsten W, tantalum Ta, molybdenum Mo, etc. Therefore, in the present exemplary embodiment, descriptions explained in the first exemplary embodiment will be properly omitted and the same elements as the first exemplary embodiment will be denoted by the same reference numerals.

Figure 8:
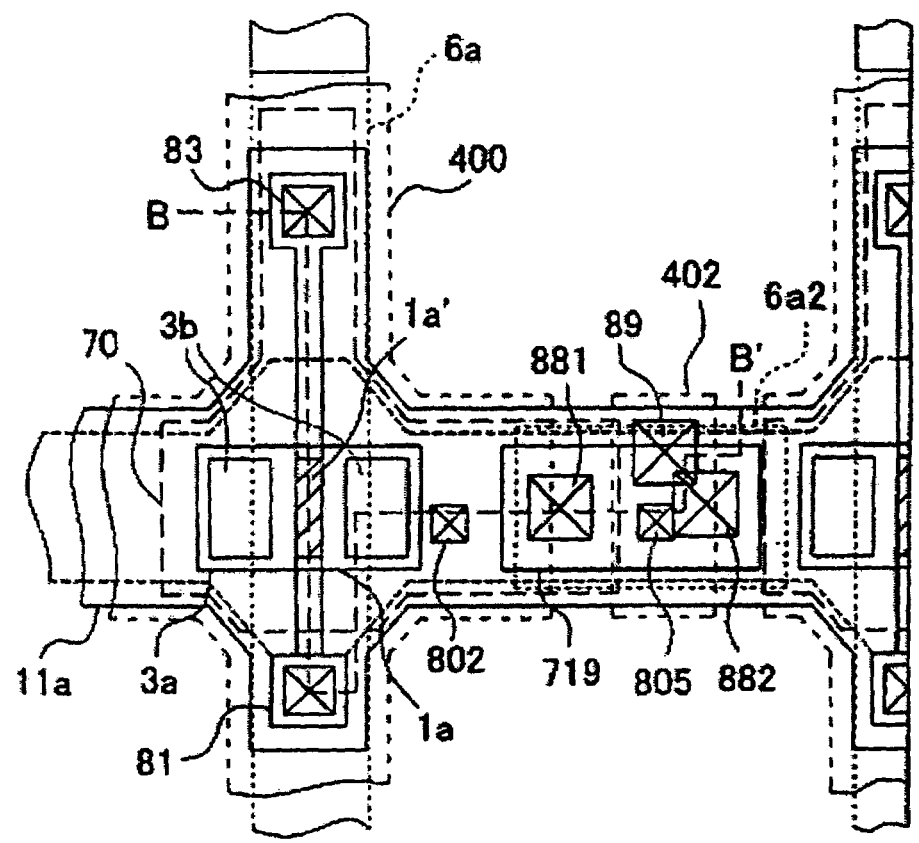
FIG. 8 is a partially-enlarged schematic plan view illustrating the pixels on the TFT array substrate according to a second exemplary embodiment.
Figure 9:
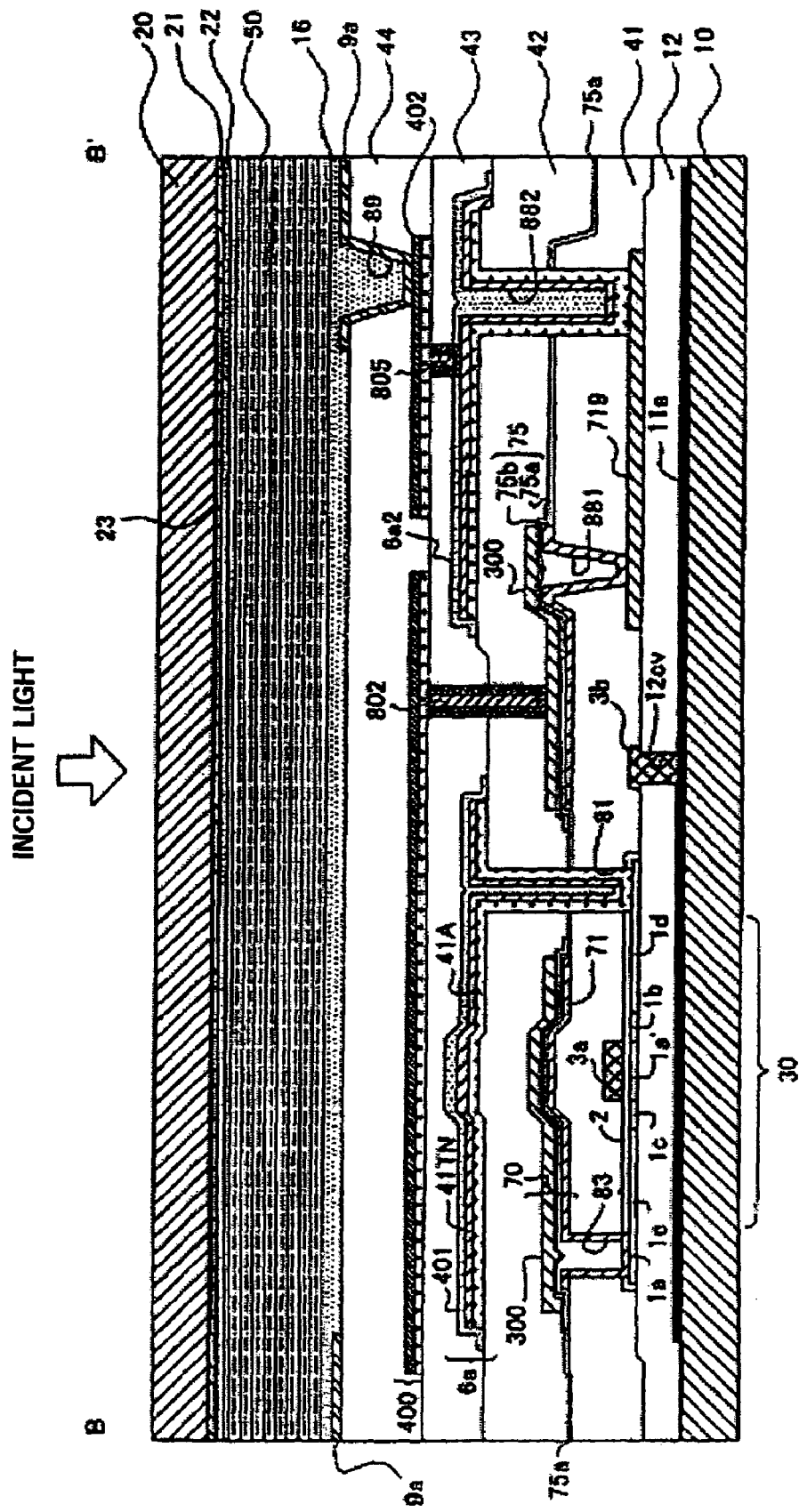
FIG. 9 is a schematic cross-sectional view taken along Line B-B' of FIG. 8.

FIG. 8 is a schematic plan view illustrating a main part of the present exemplary embodiment and FIG. 9 is a schematic cross-sectional view taken along Line B-B' of FIG. 8. Here, the diameter of the plugs 802 and 805 is about 0.5 μm and is smaller than those of other contact holes. Accordingly, the pixel pitch can be more narrowed. In this case, since the plug 802 is close to the TFT 30, the plug has a slight light-shielding function for the TFT 30. Incidentally, the contact hole using the plug generally has an aspect ratio of 1 or more.

The plugs 802 and 805 have a structure where, for example, Ti and TiN are sequentially formed from the outside and a W core is formed in the inside thereof. Specifically, the interlayer insulating films 42 and 43 are opened, for example, in the shape illustrated, and Ti with a thickness of 20 nm and TiN with a thickness of 25 nm are sequentially formed therein using a sputtering method. Since Ti reduces the contact resistance with the capacitor electrode 300 made of poly-silicon and TiN makes attachment of W easy, Ti and TiN are desirable. W is formed in a thickness of 500 nm using a CVD (Chemical Vapor Deposition) method. By using the CVD method, the coverage is much enhanced compared with the sputtering method, and thus even very deep hole can be filled clearly. However, in order to completely fill the hole using the above method, it is necessary to set the total thickness of films to be formed to the radius of the hole or more. Accordingly, it is preferable that the diameter of the plugs 802 and 805 are designed to be small. Last, using an etch-back method, the stacked portions of filling materials are removed from the surface of the third interlayer insulating film 43. Hitherto, an example where the plug is formed out of three layers of Ti/TiN/W is described, but the exemplary embodiments of present invention is not limited to this structure and one of the respective layers may be used.

Since the plugs 802 and 805 have different lengths, the respective holes may be formed separately, and both holes may be formed simultaneously using the second relay electrode 6a2 as a stopper. In the latter, since the plugs 802 and 805 can be simultaneously formed, it is possible to reduce the number of processes compared with the related art case.

In the second exemplary embodiment, since the capacitor line 400 and the capacitor electrode 300 opposite to each other with the interlayer insulating films 42 and 43 therebetween are integrally connected, to each other through the plug 802, that is, since one plug penetrates a plurality of interlayer insulating films, it is possible to further decrease the pitch. The plug 802 can shield the TFT 30 from light in the vicinity thereof.

3: Exemplary Modification

Next, an exemplary modification of the exemplary embodiment will be described.

Figure 10:
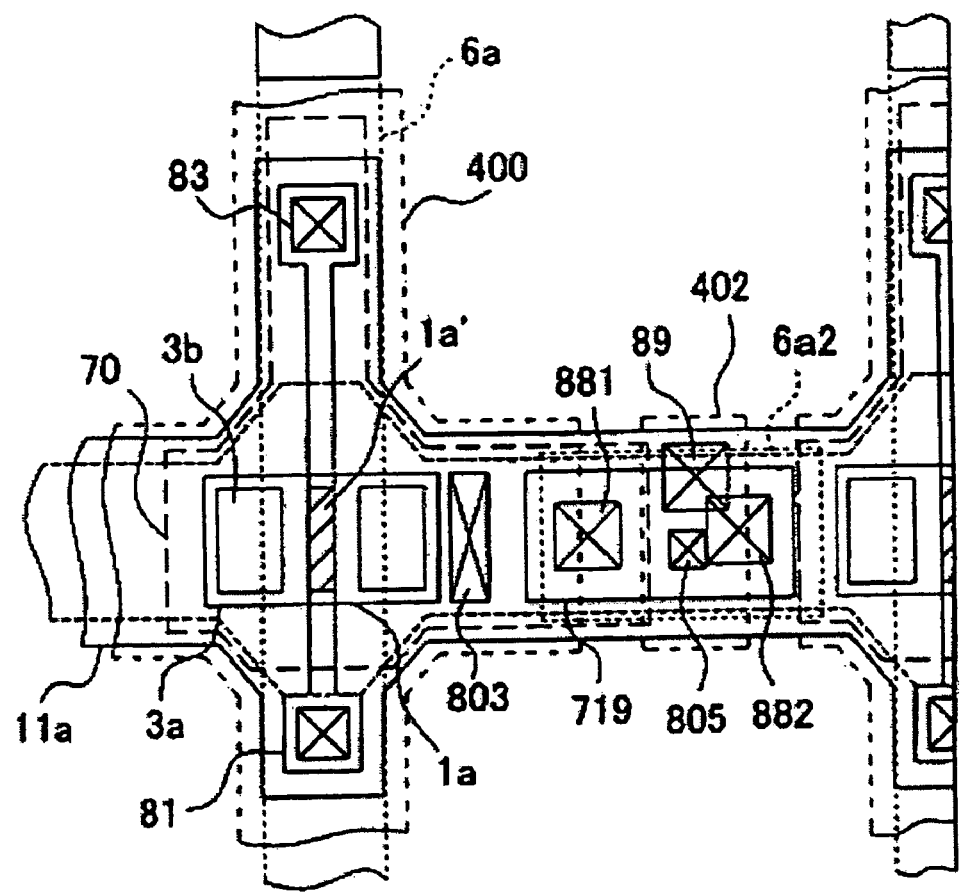
FIG. 10 is a schematic plan view illustrating a structure of the TFT array substrate according to an exemplary modification of the second exemplary embodiment correspondingly to FIG. 8.

FIG. 10 is a schematic plan view illustrating a plug 803 according to an exemplary modification of the plug 802 correspondingly to FIG. 8. In FIG. 10, the plug 803 has a two-dimensional shape in which the side edge in the width direction of the non-open area (that is, a direction along the channel length which is the Y direction in FIG. 10) extends along one end of the TFT 30. That is, the width of the plug 803 in the extension direction of the non-open area (that is, the X direction in FIG. 10) is similar to that of the plug 802, but the width in the width direction of the non-open area (in the direction along the channel length) is equal to or greater than that of the semiconductor layer 1a, that is, a length (channel length) of the channel region 1a'.

Therefore, since the plug 803 is narrow similarly to the plug 802 as seen in the X direction, it is possible to further decrease the pitch. In addition, since the side wall surface serves as a partition having a height of from the interlayer insulating film 42 to the interlayer insulating film 43 similarly to the contact hole 801 as seen in the Y direction, it is possible to sufficiently intercept the light incident to the TFT 30 from the upside of the slope.

As described in detail in the second exemplary embodiment, it is preferable that the diameter of the hole filled with W is small in the formation state of films, but since the diameter in the X direction of the plug 803 having a narrow and long hole shape is small, the hole can be filled similarly to the plug 802.

In the aforementioned exemplary embodiments, the contact hole 801 and the plugs 802 and 803 are provided in only one, but the contact hole of exemplary embodiments of the present invention is not limited to only one but may be provided plurally. Specifically, a plurality of contact holes may be disposed in a large area like the formation area for the contact hole 801, or may be distributed and disposed at places which can be opened. An example of this case may include a case where the formation area for the contact hole is restricted with variation in layout performed for decrease in pitch, etc. or a case where the position or shape of the contact hole is designed in consideration of effecting shielding of the TFT.

4: Third Exemplary Embodiment

Next, a third exemplary embodiment of the electro-optical device according to exemplary embodiments of the present invention will be described with reference to FIGS. 11 to 14.

Figure 11:
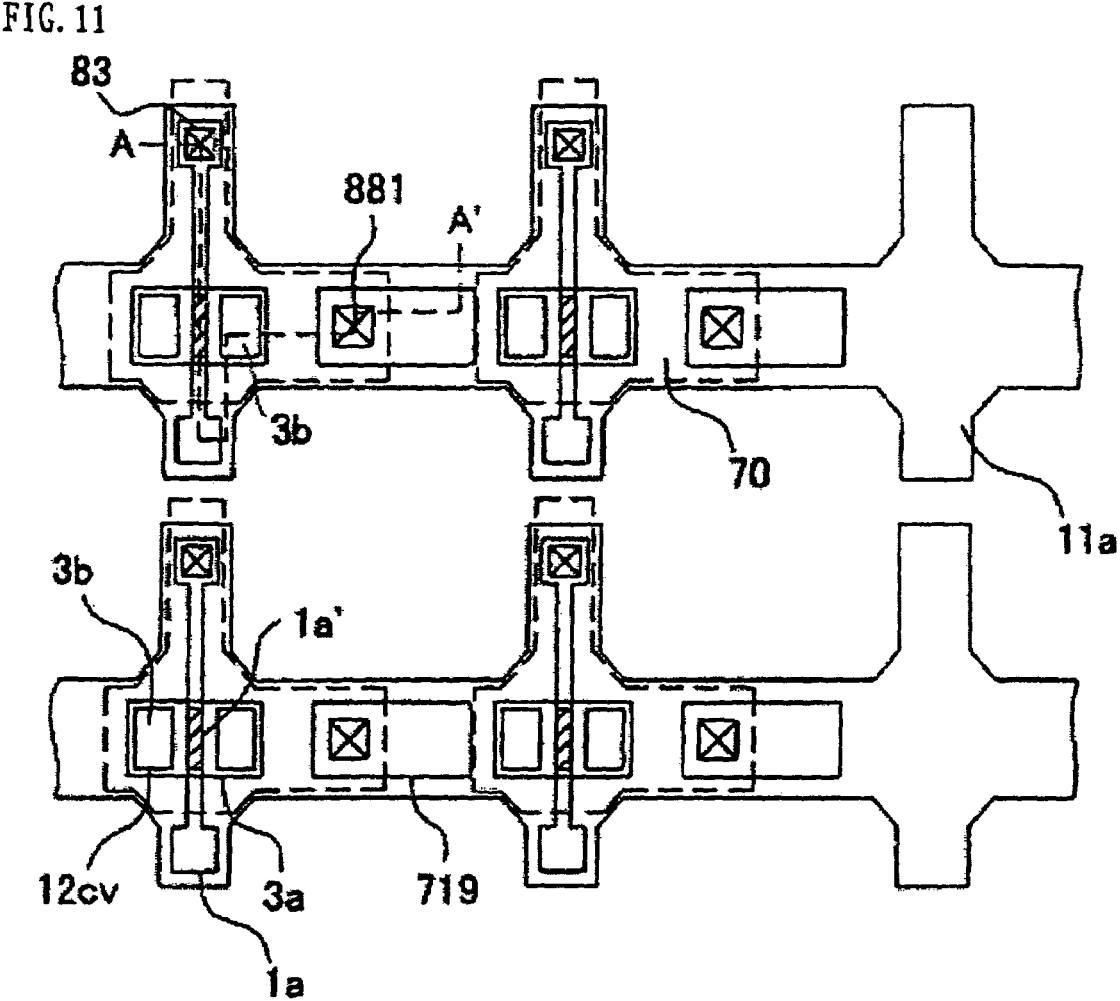
FIG. 11 is a schematic plan view illustrating the pixels on the TFT array substrate according to a third exemplary embodiment, where only a structure of the lower-layer portion (the portion corresponding to the lower layers reaching the reference numeral 70 (storage capacitor) in FIG. 14) is shown.
Figure 12:
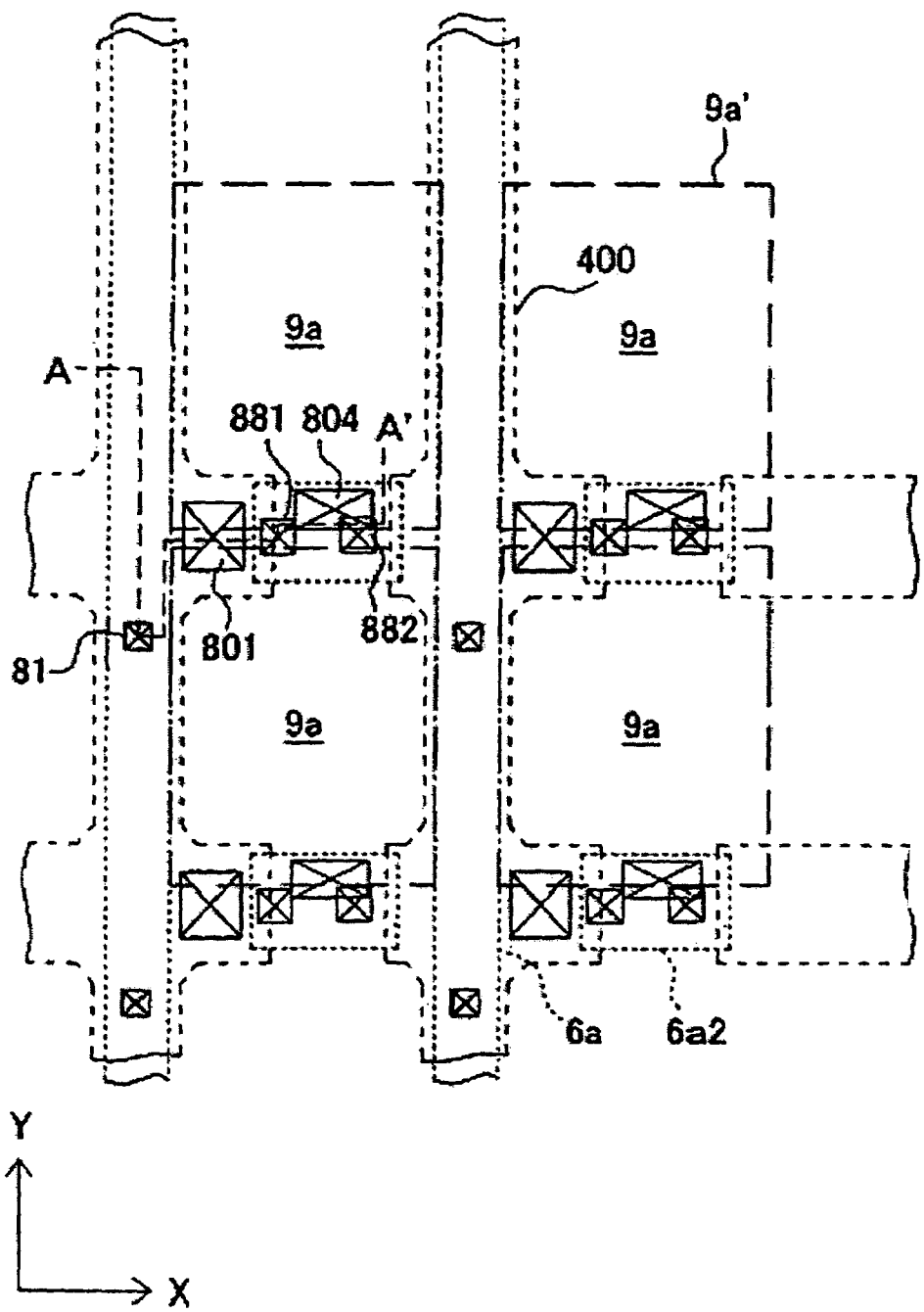
FIG. 12 is a schematic plan view illustrating the pixels on the TFT array substrate according to the third exemplary embodiment, where only a structure of the upper-layer portion (the portion corresponding to the upper layers positioned above the reference numeral 70 (storage capacitor) in FIG. 14) is shown.
Figure 13:
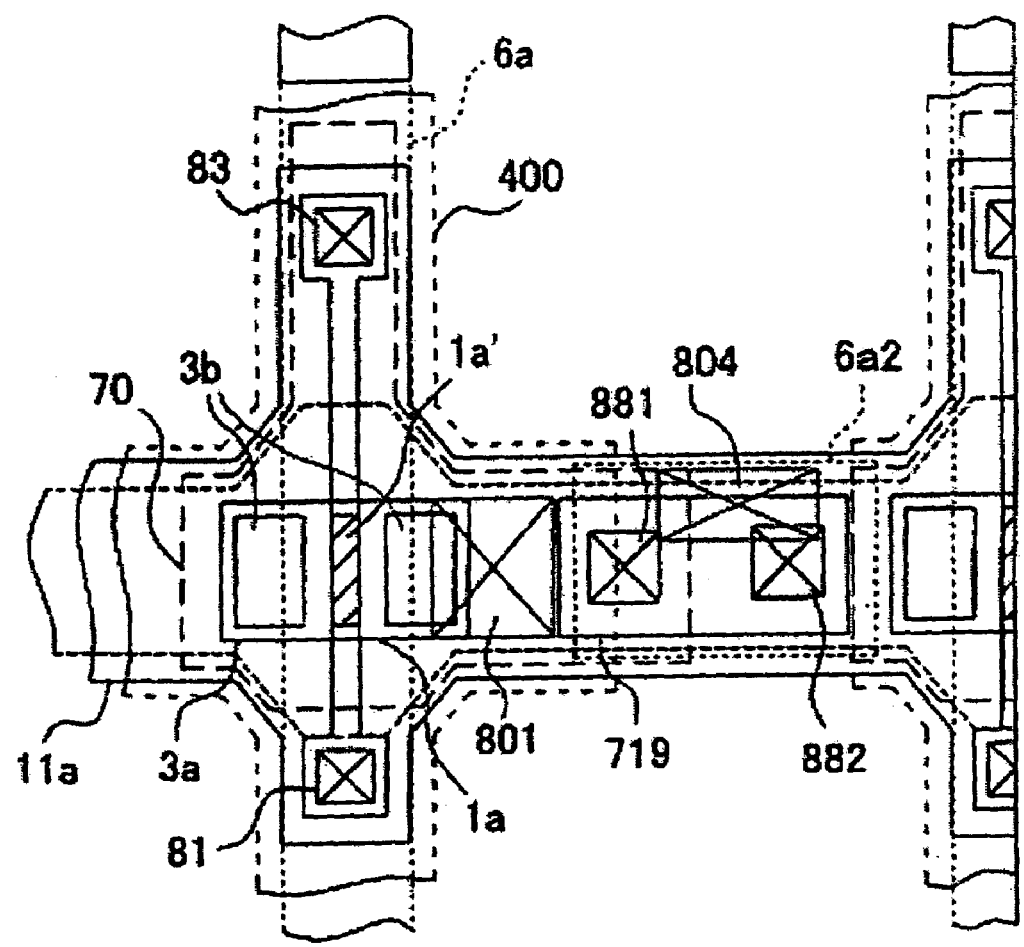
FIG. 13 is a partially-enlarged schematic plan view illustrating a case where
Figure 14:
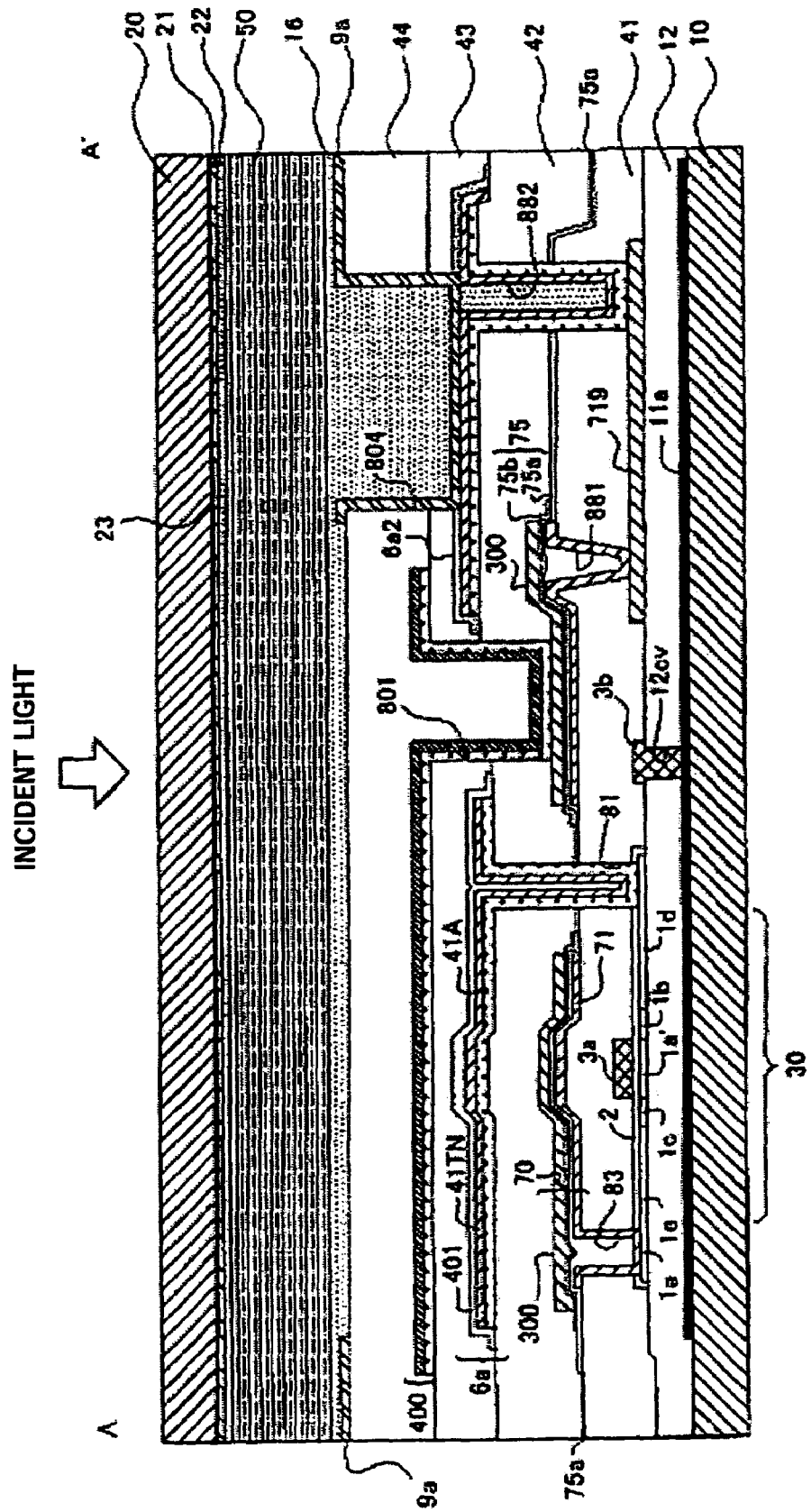
FIG. 14 is a schematic cross-sectional view taken along Line A-A' in the case where

The whole structure of the electro-optical device according to the present exemplary embodiment is similar to that of the first exemplary embodiment described with reference to FIGS. 1 and 2. In the structure of the image display area of the electro-optical device according to the present exemplary embodiment, the equivalent circuit of the pixel portion is similar to the description referring to FIG. 3 in the first exemplary embodiment. The theoretical structure of the pixel portion is similar to the description in the first exemplary embodiment. FIGS. 11 to 13 are partial schematic plan views illustrating portions related to the pixel portion on the TFT array substrate. FIGS. 11 and 12 correspond to the lower-layer portion (FIG. 11) and the upper-layer portion (FIG. 12) in the stacked structure to be described later, respectively. FIG. 13 is an enlarged schematic plan view of the stacked structure, where FIGS. 11 and 12 overlap each other. FIG. 14 is a schematic cross-sectional view taken along Line A-A' when FIGS. 11 and 12 overlap each other. In FIG. 14, in order to allow the respective layers and members to be recognized from the drawing, the scale ratio of the respective layers and members are properly varied.

4-1: Specific Structure of Pixel Portion

Next, a specific structure of the pixel portion for embodying the aforementioned operation will be described with reference to FIGS. 11 to 14.

In FIGS. 11 to 14, the respective circuit elements of the aforementioned pixel portion are constructed as conductive films patterned and stacked on the TFT array substrate 10. The TFT array substrate 10 is made of, for example, a glass substrate, a quartz substrate, an SOI substrate, a semiconductor substrate, etc., and is disposed to be opposite to the counter substrate 20 made of, for example, a glass substrate or a quartz substrate. The respective circuit elements include, sequentially from the bottom, a first layer including the scanning line 11a, a second layer including the gate electrode 3a, a third layer including a fixed-potential side capacitor electrode of the storage capacitor 70, a fourth layer including the data line 6a, etc., a fifth layer including the capacitor line 400, etc., and a sixth layer including the pixel electrode 9a, etc. An underlying insulating film 12 is provided between the first and second layers, a first interlayer insulating film 41 is provided between the second and third layers, a second interlayer insulating film 42 is provided between the third and fourth layers, a third interlayer insulating film 43 is provided between the fourth and fifth layers, and a fourth interlayer insulating film 44 is provided between the fifth and sixth layers, respectively, thereby reducing or preventing the respective elements from being short-circuited. The first to third layers are shown as the lower-layer portion in FIG. 11 and the fourth to sixth layers are shown as the upper-layer portion in FIG. 12.

(Structure of First Layer—Scanning Line, etc.)

The first layer includes the scanning lines 11a. Each scanning line 11a is patterned in a shape having a main line portion extending in the X direction of FIG. 11 and a projection portion extending in the Y direction of FIG. 4 in which the data lines 6a or the capacitor lines 400 extend). The scanning line 11a is made of, for example, conductive poly-silicon, and, in addition, may be made of a single metal, an alloy, a metal silicide, a poly silicide, or a stacked body thereof, including at least one of high melting-point metals such as titanium (Ti), Chromium (Cr), tungsten (W), tantalum (Ta), molybdenum (Mo), etc.

(Structure of Second Layer—TFT, etc.)

The second layer includes the TFTs 30 and relay electrodes 719. Each TFT 30 has, for example, an LDD (Lightly Doped Drain) structure, and includes a gate electrode 3a, a semiconductor layer 1a, and an insulating film 2 including a gate insulating film for electrically separating the gate electrode 3a and the semiconductor layer 1a. The gate electrode 3a is made of, for example, conductive poly-silicon. The semiconductor layer 1a is made of, for example, poly-silicon, and includes a channel region 1a', a low-concentration source region 1b, a low-concentration drain region 1c, a high-concentration source region 1d, and a high-concentration drain region 1e. The TFT 30 preferably has an LDD structure, but may have an off-set structure in which impurities are not injected into the low-concentration source region 1b and the low-concentration drain region 1c, and may have a self-aligned structure in which the high-concentration source region and the high-concentration drain region are formed by injecting impurities using the gate electrode 3a as a mask. The relay electrode 719 is made of, for example, the same film as the gate electrode 3a.

The gate electrode 3a of each TFT 30 is electrically connected to the scanning line 11a through the contact hole 12cv formed in the underlying insulating film 12. The underlying insulating film 12 is made of, for example, a silicon oxide film, and has a function reducing or preventing variation in element characteristic of the TFT 30 resulting from roughness or contamination due to polishing the substrate surface by covering the whole surface of the TFT array substrate 10, as well as a function electrically separating the first and second layers.

(Structure of Third Layer—Storage Capacitor, etc.)

The third layer includes the storage capacitors 70, etc. Each storage capacitor 70 has a structure in which a capacitor electrode (a fixed-potential side electrode of the storage capacitor) 300 and a lower electrode (a pixel-potential side electrode of the storage capacitor) 71 are disposed to be opposite to each other with a dielectric film 75 therebetween. The capacitor electrode 300 constituting an example of the "fixed-potential side electrode" according to the exemplary embodiments of present invention is electrically connected to the capacitor line 400. The lower electrode 71 constituting an example of the "pixel-potential side electrode" according to the exemplary embodiments of present invention is electrically connected to the high-concentration drain region 1e of the TFT 30 and the pixel electrode 9a, respectively.

The lower electrode 71 and the high-concentration drain region 1e are connected to each other through a contact hole 83 opened in the first interlayer insulating film 41. The lower electrode 71 and the pixel electrode 9a are electrically connected to each other through a path formed by allowing contact holes 881, 882, and 804 to relay the respective layers of the relay electrode 719 and the second relay electrode 6a2.

The capacitor electrode 300 is made of, for example, a single metal, an alloy, a metal silicide, a poly silicide, a stacked body thereof, including at least one of high melting-point metals such as Ti, Cr, W, Ta, Mo, etc., or preferably tungsten silicide. Accordingly, the capacitor-electrode has a function intercepting light to be incident on the TFT 30 from the upside. The lower electrode 71 is made of, for example, conductive poly-silicon.

The dielectric film 75 is made of, for example, a silicon oxide film such as an HTO (High Temperature Oxide) film, an LTO (Low temperature Oxide) film, etc., or a silicon nitride film, etc., which has a relatively thin thickness of about 5 to 200 nm.

The first interlayer insulating film 41 is made of; for example, NSG (Non Silicate Glass). In addition, the interlayer insulating film 41 may be made of silicate glass such as PSG (Phospho Silicate Glass), BSG (Boro Silicate Glass), BPSG (Boro Phospho Silicate Glass), etc., silicon nitride, silicon oxide, etc.

In this case, as can be seen from the plan view of FIG. 11, since the storage capacitor 70 is formed such that it should not reach a pixel-opening area approximately corresponding to the formation area for the pixel electrode 9a (such that it is received in a non-open area), the aperture ratio of a pixel is kept relatively great.

(Structure of Fourth Layer—Data Line, etc.)

The fourth layer includes the data lines 6a. Each data line 6a is made of a three-layer film having aluminum, titanium nitride, and silicon nitride sequentially from the downside. The silicon nitride layer is patterned in a slightly greater size to cover the aluminum layer and the titanium nitride layer which are the lower layers thereof. In the fourth layer, the second relay electrode 6a2 is made of the same film as the data line 6a. These layers are formed to be separated from each other, as shown in FIG. 12.

Among them, the data line 6a is electrically connected to the high-concentration source region Id of the TFT 30 through the contact hole 81 penetrating the first interlayer insulating film 41 and the second interlayer insulating film 42 The second relay electrode 6a2 is electrically connected to the relay electrode 719 through the contact hole 882 penetrating the first interlayer insulating film 41 and the second interlayer insulating film 42, as described above. The second interlayer insulating film 42 can be made of silicate glass such as NSG, BSG, BPSG, etc., silicon nitride, silicon oxide, etc.

(Structure of Fifth Layer—Capacitor Line, etc.)

The fifth layer includes the capacitor lines 400. Each capacitor line 400 is a specific example of a "shield layer" according to exemplary embodiments of the present invention, and has a function electromagnetically shielding the pixel electrode 9a from interconnections such as the data line 6a below it. Each capacitor line 400 extends to around the image display area 10a and is electrically connected to a constant potential source, thereby holding a constant potential. The capacitor line 400 is formed with a width broader than that of the data line 6a, the scanning line 11a, and the TFT 30, so as to cover the circuit elements. That is, the capacitor lines 400 are formed broader than the data lines 6a and the scanning lines 11a in the respective width directions thereof. Accordingly, the respective circuit elements are shielded from light and reflect the incident light, thereby reducing or preventing a bad influence that outlines of the pixels become faint in projected images. In addition, the capacitor line 400 has, for example, a two-layer structure formed by stacking aluminum and titanium nitride.

Corner portions in which the portions extending in the X direction and the portions extending in the Y direction of the capacitor lines 400 are accurately intersected have a shape that a shielded portion is slightly protruded (a rounded shape). Interception of light to the semiconductor layer 1a of the TFT 30 can be effectively accomplished by the shielded portion. That is, since the shielded portion reflects or absorbs the light incident to the semiconductor layer 1a from the upside of the slope, the light leakage current in the TFT 30 is suppressed, so that it is possible to display high-quality images without flickering.

The capacitor line 400 constituting an example of the "shield layer" according to exemplary embodiments of the present invention is electrically connected to the capacitor electrode 300 of the storage capacitor 70, which is an example of the "pixel-potential side electrode" according to exemplary embodiments of the present invention, through the contact hole 801 integrally penetrating the third interlayer insulating film 43 and the second interlayer insulating film 42. Since the contact hole 801 is filled with the capacitor line 400, the bottom surface and the side wall surface thereof reflects or absorbs the light. In addition, as shown in FIG. 13, the contact hole 801 is disposed to extend in parallel to the TFT 30 in the extension direction (that is, the X direction of FIG. 13) of the non-open area and to partially overlap an end of the TFT 30. The diameter of the contact hole 801 is large, and the width in the channel length direction of the hole diameter (the width in the width direction of the non-open area) is equal to or greater than the length of the channel region 1a' (channel length) of the TFT 30. In addition, as shown in FIG. 14, the bottom surface, of the contact hole 801 is positioned in the third layer and the contact hole is closer to the semiconductor layer 1a than other light-shielding layers such as the capacitor line 400. Therefore, it is possible to more surely shield the TFT 30, specifically, the semiconductor layer 1a.

That is, the side wall surface of the contact hole 801 serves as a partition having a height of from the interlayer insulating film 42 to the interlayer insulating film 43, thereby excellently intercepting the light incident to the TFT 30 from the upside of the slope. The bottom surface having a larger width can also shield the TFT 30 from the light.

However, since it is considered that it is relatively difficult to etch the depth from the third interlayer insulating film 43 to the second interlayer insulating film 42, a method that a relay layer is provided on the second interlayer insulating film 42 and the contact holes formed in the respective interlayer insulating films are connected to each other through the relay layer to be perpendicular to the layer plane is employed. However, when the pixel portion is decreased in pitch, the size of the formation area is more important than the depths of the contact holes. That is, since the contact holes cannot be formed to overlap each other at one position as two-dimensionally seen (for example, see the contact holes 882, 804, and 89 in FIGS. 13 and 14), the contact holes are provided at positions different from each other. Therefore, since it is necessary to secure a margin area around the respective contact holes, the whole formation area of the contact holes are thus increased. As can be seen from FIG. 14, the contact hole connecting the capacitor line 400 to the storage electrode 300 must be provided to pass through the gap between the data line 6a and the second relay electrode 6a2, but if the gap is narrowed due to decrease in pitch, it is difficult to form the contact hole having the above structure. The inventors of exemplary embodiments of the present invention found out that when the pixel pitch is about 10 µm, the formation area for the contact hole is not sufficiently secured.

In contrast, in the present exemplary embodiment, the capacitor line 400 and the storage electrode 300 are connected using only the contact hole 801. The formation area for the contact hole 801 is greater than those of other contact holes, but is equal to or less than that of the related art structure.

In the related art structure, light may be leaked from the gap between the contact holes to the TFT 30, thereby causing the light leakage current. In contrast, in the present exemplary embodiment, as shown in FIG. 14, the contact hole 801 intercepts the light inputting from the upside of the slope, thereby reducing or preventing the leakage of light to the TFT 30 side.

Here, the aspect ratio, that is, the ratio of the depth to the width, of the contact hole 801 is set to 1 or less. Generally, when a contact hole has a large depth (that is, when the aspect ratio is greater than 1), the formation of inner lines using a sputtering method can deteriorate the coverage inside the contact hole, thereby generating discontinuous portions. However, since the contact hole 801 has a large diameter, such connection failure can be reduced or prevented, so that it is possible to more easily perform the opening, compared with a case where the diameter is small.

Under the fifth layer, the third interlayer insulating film 43 is formed on the whole surface. The third interlayer insulating film 43 may be made of, for example, silicate glass such as NSG, PSG, BSG, BPSG, etc., silicon nitride, silicon nitride, or the like.

(Structure of Sixth Layer—Pixel Electrode, etc.)

The fourth interlayer insulating film 44 is formed on the whole surface of the fifth layer, and the pixel electrodes 9a are formed thereon as the sixth layer. The fourth interlayer insulating film 44 may be made of silicate glass such as NSG, PSG, BSG, BPSG, etc., silicon nitride, silicon oxide, etc.

Since the fourth interlayer insulating film 44 is formed on the contact hole: 801 having a large diameter, the surface thereof right after the formation of the fourth interlayer insulating film may be recessed right on the contact hole 801. However, in the present exemplary embodiment, the fourth interlayer insulating film 44 is formed thick in advance and the surface thereof is subjected to the CMP process. In the CMP process, the chemical and mechanical polishing is performed by allowing the substrate surface to rotationally come in contact with a polishing pad fixed onto a polishing plate while supplying liquid-state slurry (chemical polishing liquid) including silica particles. An example of another planarization process can include a mechanical polishing process, etc. The surface of the fourth interlayer insulating film 44 is planarized through such a process, and thus unevenness of liquid crystal alignment in the liquid crystal layer 50 is reduced or prevented, thereby allowing high-quality images to be displayed. The pixel electrodes 9a (of which the outlines are indicated by a dotted line 9a' in FIG. 12) are disposed at the pixel areas which are partitioned and arranged laterally and longitudinally, and the data lines 6a and the scanning lines 11a are arranged in a lattice shape on the boundaries thereof (see FIGS. 11 and 12). The pixel electrodes 9a are made of a transparent conductive film such as ITO (Indium Tin oxide), etc.

The pixel electrode 9a is electrically connected to the second relay electrode 6a2, which is an example of "a part of the second conductive light-shielding film." according to exemplary embodiments of the present invention, through the contact hole 804 integrally penetrating the interlayer insulating films 44 and 43 (see FIG. 14). Therefore, the formation area for the contact hole 804 is greater than those of other contact holes, but the structure where the contact hole formed in the interlayer insulating films 44 and 43 is connected to the layer surface through the relay layers to be perpendicular thereto has a size equal to or less than those other contact holes. Accordingly, the electro-optical device can cope with decrease in pitch.

The contact hole 804 extends in the extension direction of the non-open area (that is, in the X direction of FIG. 13) so as to avoid other contact holes in the non-open area, and the diameter thereof is as large as possible in the restricted area. Accordingly, the coverage of the pixel electrodes 9a formed inside the contact hole 804 is enhanced, so that it is possible to reduce or prevent the connection failure. Compared with a case where the diameter is small, a deep hole can be relatively easily formed. The alignment film 16 is formed on the pixel electrodes 9a. Hitherto, the structure of the pixel portion on the TFT array substrate 10 is described.

On the other hand, the counter electrode 21 is provided on the whole opposite surface of the counter substrate 20 and the alignment film 22 is provided thereon (under the counter electrode 21 in FIG. 13). The counter electrode 21 is made of a transparent conductive film such as ITO, etc., similarly to the pixel electrode 9a. In order to reduce or prevent the light leakage current from being generated in the TFTs 30, the light-shielding film 23 is provided between the counter substrate 20 and the counter electrode 21 to cover at least the area right opposite to the TFTs 30.

The liquid crystal layer 50 is interposed between the TFT array substrate 10 and the counter substrate 20 constructed as described above. The liquid crystal layer 50 is formed by injecting liquid crystal into a space formed by sealing the circumferential edges of the substrates 10 and 20 with a seal member. The liquid crystal layer 50 has a predetermined alignment state by means of the alignment film 16 and the alignment film 22 having been subjected to an alignment process such as a rubbing process, etc., in a state where an electric field is not applied between the pixel electrodes 9a and the counter electrode 21.

The structure of a pixel portion described above is common to the respective pixel portions, as shown in FIGS. 11 and 12. Such pixel portions are periodically formed in the aforementioned image display area 10a (see FIG. 1 of the first embodiment). On the other hand, in the electro-optical device, as described with reference to FIGS. 1 and 2 of the first exemplary embodiment, driving circuits such as the scanning-line driving circuits 104, the data-line driving circuit 101, etc. are provided in the peripheral areas around the image display area 10a.

Manufacturing Method

Next, a method of manufacturing the electro-optical device will be described with reference to FIGS. 15 to 20. FIGS. 15 to 20 are process diagrams sequentially illustrating the stacked structure of the electro-optical device in respective processes of the manufacturing method in the cross-section corresponding to FIG. 7. Here, the process of forming the contact holes 801 and 804, which are main portions of the electro-optical device according to the present exemplary embodiment, will be mainly described.

Figure 15:
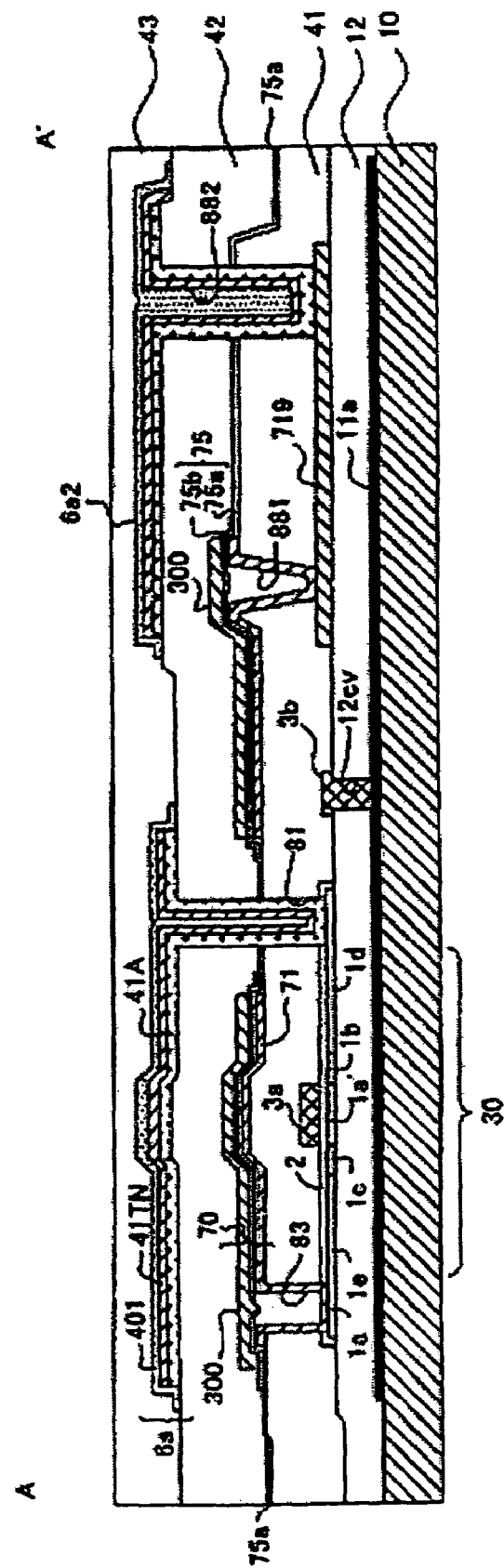
FIG. 15 is a schematic cross-sectional view sequentially illustrating a method of manufacturing the electro-optical device according to the third exemplary embodiment (first step thereof)

First, as shown in FIG. 15, the respective layer structures of from the scanning lines 11a to the third interlayer insulating film 43 are formed and stacked on the TFT array substrate 10. At this time, in the respective processes, related art semiconductor integration technologies may be used. After forming the third interlayer insulating film 43, the surface thereof is planarized using the CMP process, etc.

Figure 16:
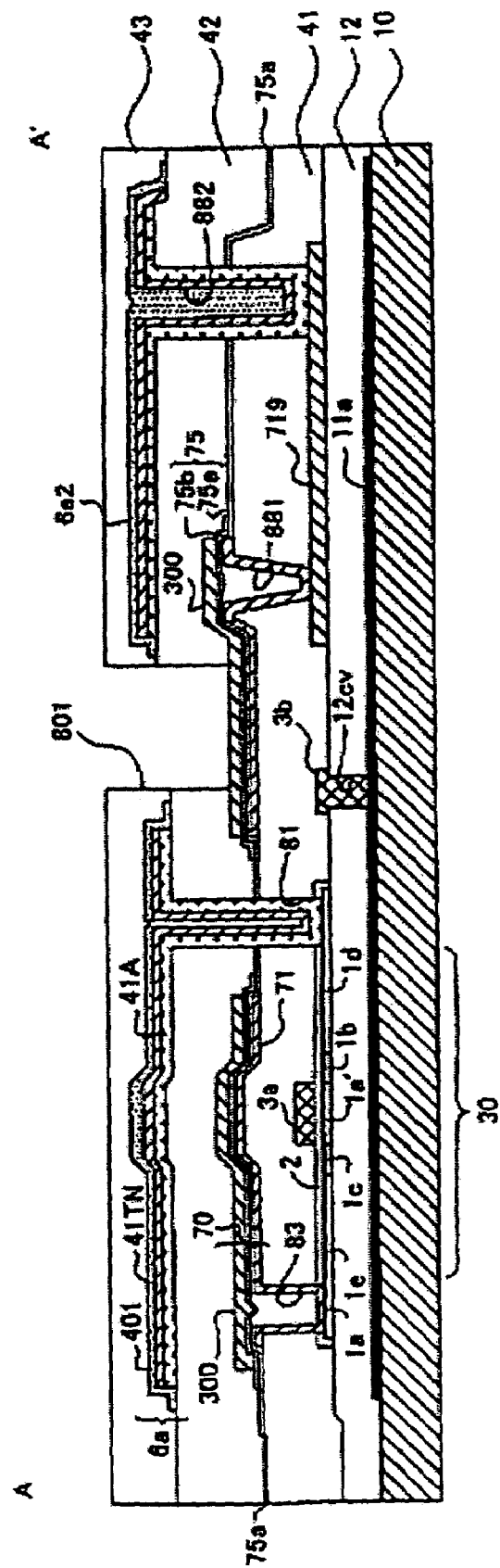
FIG. 16 is a schematic cross-sectional view sequentially illustrating the method of manufacturing the electro-optical device according to the third exemplary embodiment (second step thereof)

Next, in the process shown in FIG. 16, the etching process is performed to a predetermined position of the surface of the third interlayer insulating film 43, thereby opening the contact hole 801 having a depth reaching the capacitor electrode 300.

Figure 17:
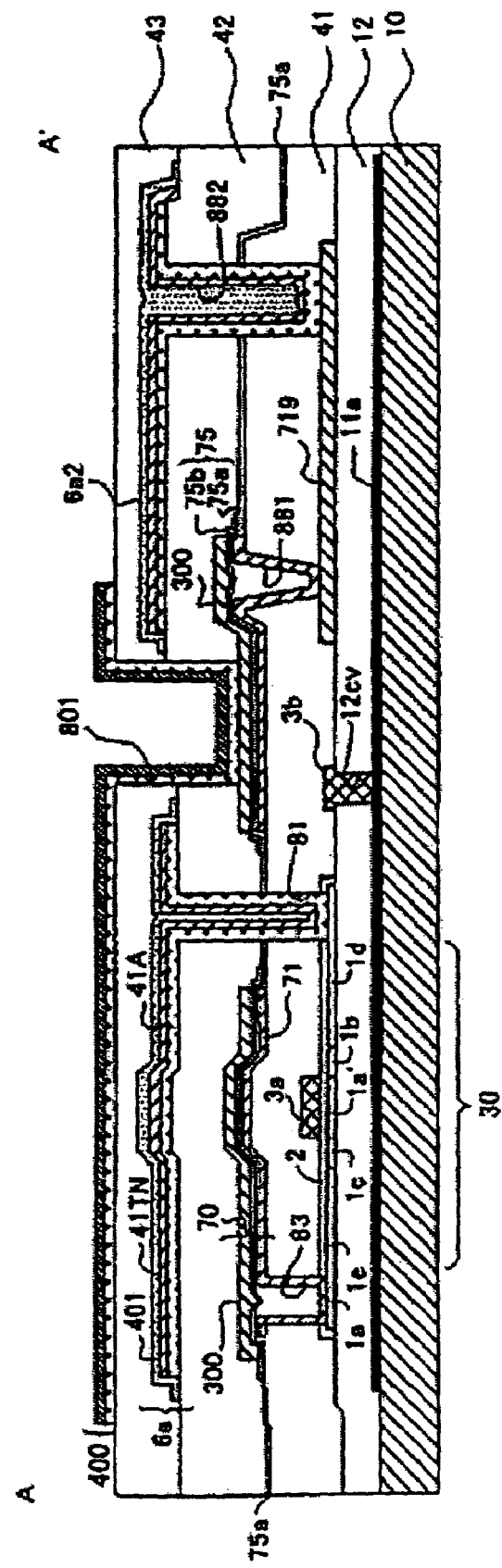
FIG. 17 is a schematic cross-sectional view sequentially illustrating the method of manufacturing the electro-optical device according to the third exemplary embodiment (third step thereof)

Next, in the process shown in FIG. 17, the capacitor line 400 is formed at a predetermined portion of the surface of the third interlayer insulating film 43. At this time, the capacitor line 400 is formed inside the contact hole 801, but since the diameter of the contact hole 801 is large, the coverage is enhanced.

When the contact holes formed in the respective layers of the interlayer insulating films 43 and 44 are connected through the relay layers between the respective layers instead of the contact hole 804, a contact hole reaching the second relay electrode 6a2 should be formed in the third interlayer insulating film 43 before or after the process. On the contrary, the contact hole 804 according to the present exemplary embodiment is formed at a time in a post process, and accordingly, such a labor is not necessary.

Figure 18:
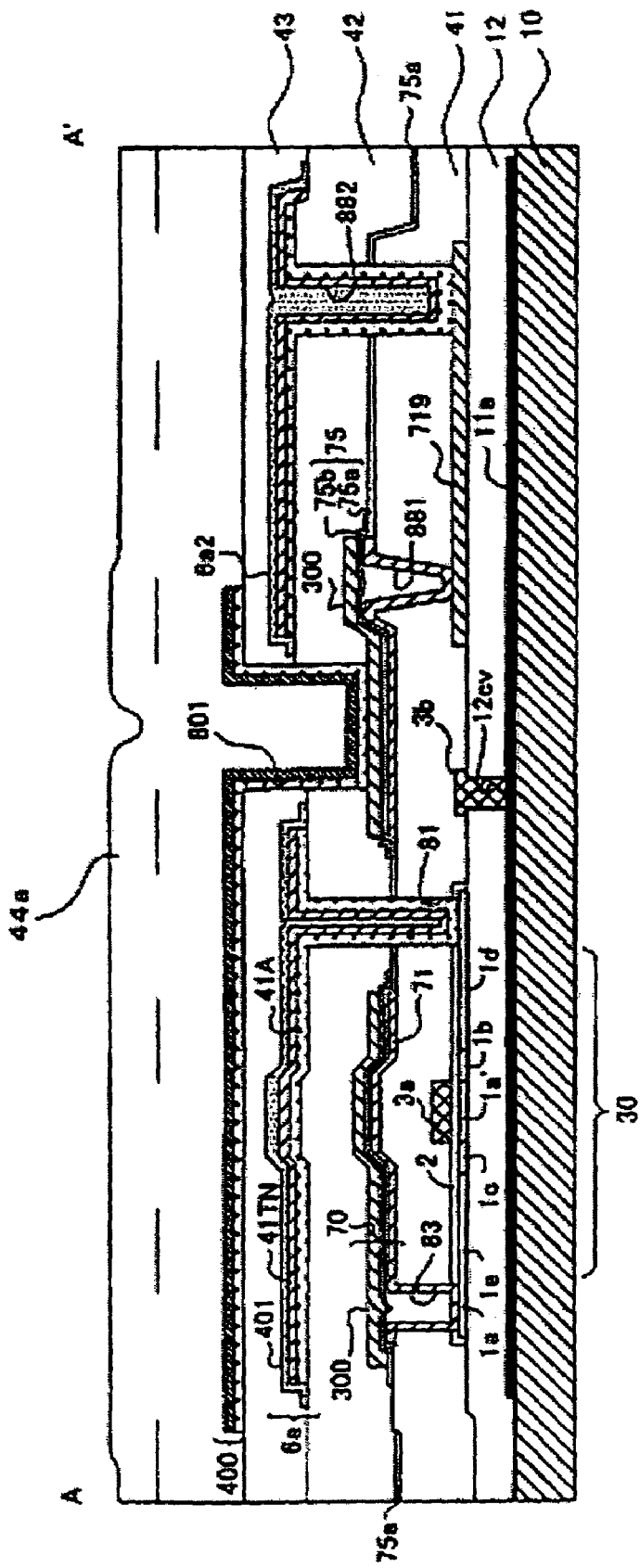
FIG. 18 is a schematic cross-sectional view sequentially illustrating the method of manufacturing the electro-optical device according to the third exemplary embodiment (fourth step thereof)

Next, in the process shown in FIG. 18, a precursor film 44a of the fourth interlayer insulating film 44 is formed on the whole surface of the TFT array substrate 10. Then, unevenness due to the contact hole 801 is generated on the surface of the precursor film 44a. Therefore, by forming the precursor film 44a thickly, cutting out the precursor film to the position indicated by a dotted line in the figure, for example, through the CMP process, and thus planarizing the surface, the fourth interlayer insulating film 44 is obtained.

Figure 19:
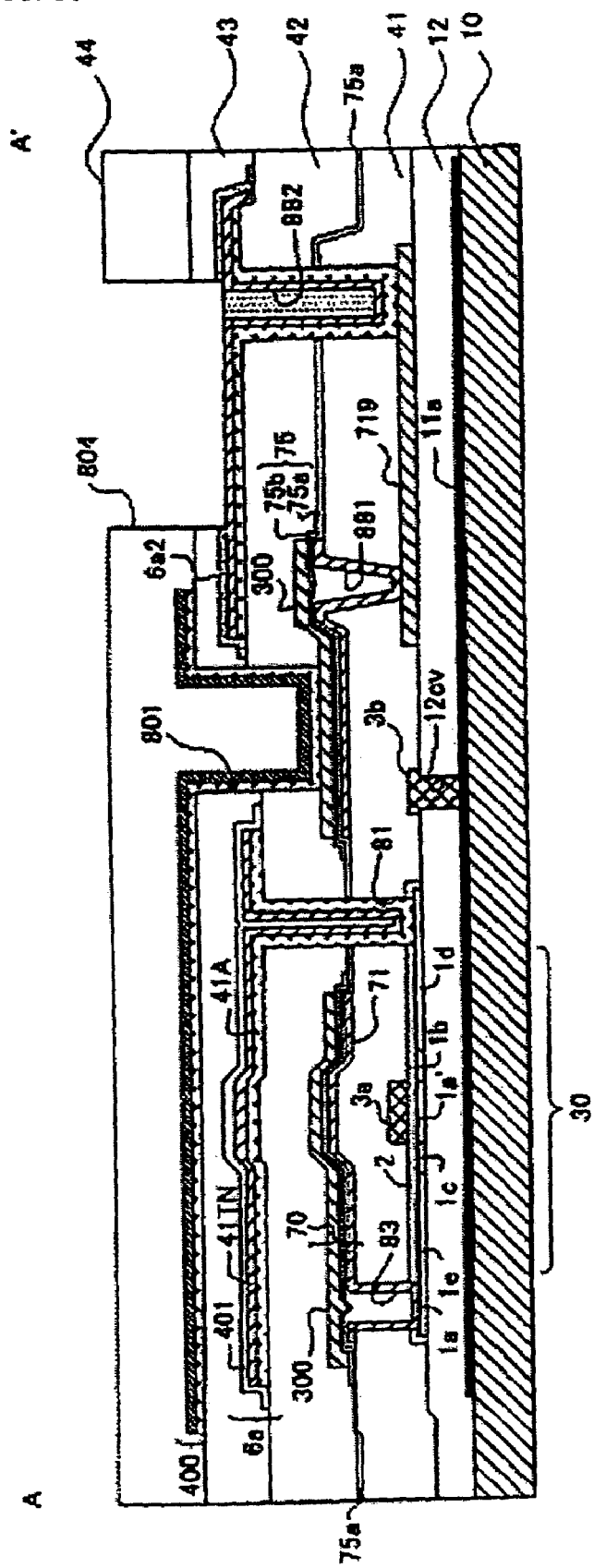
FIG. 19 is a schematic cross-sectional view sequentially illustrating the method of manufacturing the electro-optical device according to the third exemplary embodiment (fifth step thereof)

Next, in the process shown in FIG. 19, by etching a predetermined position of the surface of the fourth interlayer insulating film 44, the contact hole 804 having a depth reaching the second relay electrode 6a2 is opened.

Figure 20:
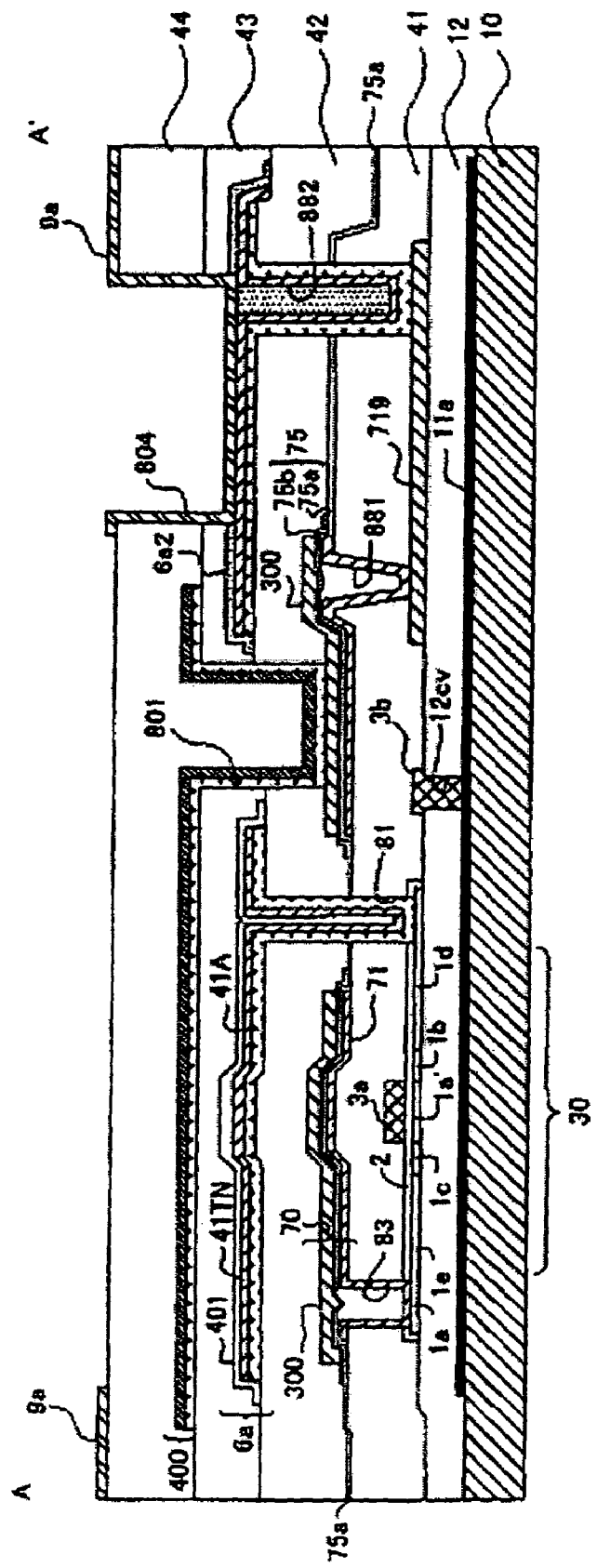
FIG. 20 is a schematic cross-sectional view sequentially illustrating the method of manufacturing the electro-optical device according to the third exemplary embodiment (sixth step thereof)

Next, in the process shown in FIG. 20, the pixel electrode 9a is formed at a predetermined position of the surface of the fourth interlayer insulating film 44. At this time, the pixel electrode 9a is formed inside the contact hole 804, but since the diameter of the contact hole 804 is large, the coverage is enhanced.

In the third exemplary embodiment, since the pixel electrode 9a and the second relay electrode 6a2 opposite to each other with the interlayer insulating films 43 and 44 therebetween are integrally connected to each other through the contact hole 804 and the capacitor line 400 and the capacitor electrode 300 opposite to each other with the interlayer insulating films 42 and 43 therebetween are integrally connected to each other through the contact hole 801, the formation areas for the contact holes 801 and 804 can be reduced, thereby accomplishing decrease in pitch. As a result, it is possible to accomplish decrease in size and increase in accuracy of the device.

By forming a plurality of contact holes of which each single contact hole penetrates a plurality of interlayer insulating films and connecting the contact holes using an interlayer insulating film as a part of the plurality of interlayer insulating films, that is, by forming two contact holes of the contact hole 804 penetrating the plurality of interlayer insulating films (44 and 43) of the upper layer side (the liquid crystal layer side) and the contact hole 801 penetrating the interlayer insulating film 43, which is a part of the lower-layer side in the plurality of interlayer insulating films (44 and 43), and the interlayer insulating film 42 positioned below it, and disposing the position of the contact hole 801 penetrating the plurality of interlayer insulating films of the lower-layer side closer to the TFT 30 (the semiconductor layer 1a) than the position of the contact hole 804 penetrating the plurality of insulating films of the upper-layer side, it is possible to effectively perform the interception of light to the semiconductor layer 1a of the TFT 30. That is, since the light entering the semiconductor layer 1a from the upside of the slope is intercepted by the plurality of contact holes penetrating the plurality of interlayer insulating films together with some interlayer insulating film, the light leakage current in the TFT 30 is reduced or prevented, so that it is possible to display high-quality images without flickering, etc.

In addition, by allowing the respective contact holes 801 and 804 to integrally connect the plurality of interlayer insulating films, the number of processes is reduced compared with a case where the contact holes are opened in the respective interlayer insulating films and the contact holes are connected.

Specifically, here, by forming the contact hole 801 and the contact hole 804 separately, the number of processes for forming the contact holes can be reduced, so that it is possible to efficiently manufacture the electro-optical device.

Since the capacitor line 400 is formed inside the contact hole 801, the contact hole has a light-shielding function, and since the contact hole is formed closer to the semiconductor layer 1a than other light-shielding films in a plan view and in a cross-sectional view, it is possible to more surely intercept the light. Therefore, the light leakage current is reduced or prevented, thereby accomplishing high-quality display.

5: Fourth Exemplary Embodiment

Next, a fourth exemplary embodiment of the present invention will be described. In the present exemplary embodiment, instead of the contact hole 801 in the third exemplary embodiment, a plug 802 filled in the contact hole connects the capacitor line 400 and the capacitor electrode 300 of the storage capacitor 70. Instead of the contact hole 804, a plug 805 is provided inside the contact hole. Here, the plug means a metal structure of, for example, a pillar shape (a spicula shape) which is filled with metal such as titanium (Ti), chromium Cr, tungsten W. tantalum Ta, molybdenum Mo, etc. Therefore, in the present exemplary embodiment, descriptions explained in the third exemplary embodiment will be properly omitted and the same elements as the third exemplary embodiment will be denoted by the same reference numerals.

Figure 21:
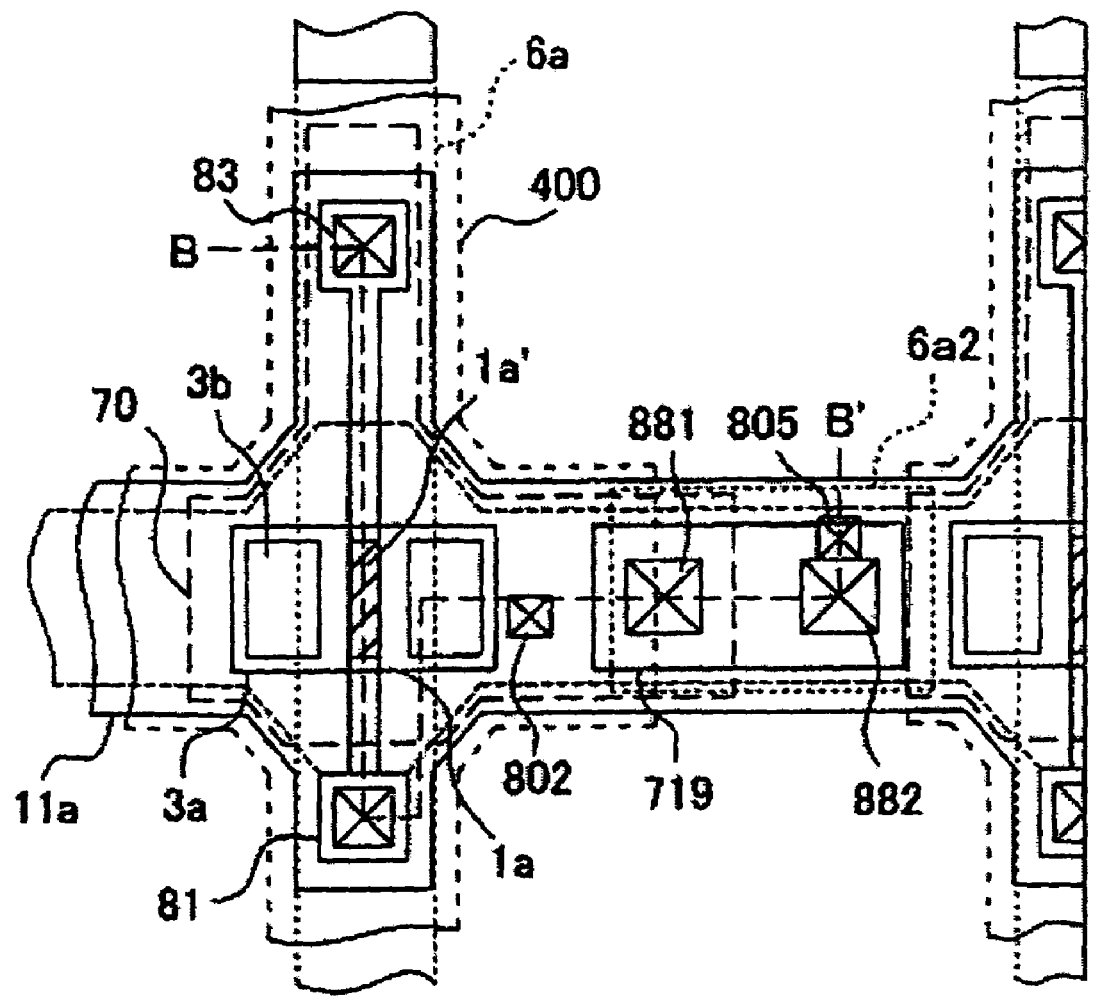
FIG. 21 is a partially-enlarged schematic plan view illustrating the pixels on the TFT array substrate according to a fourth exemplary embodiment.
Figure 22:
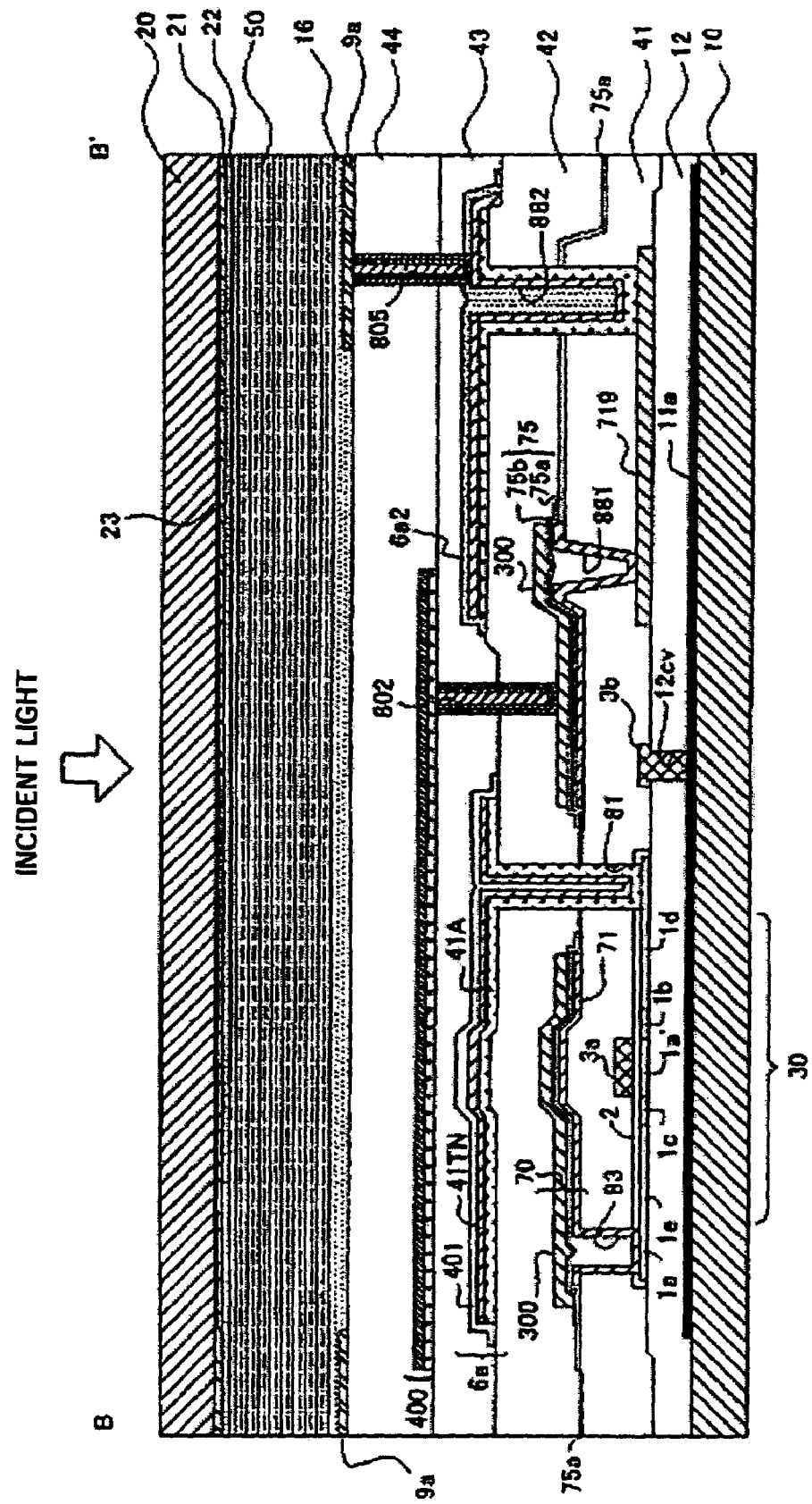
FIG. 22 is a schematic cross-sectional view taken along B-B' of FIG. 21.

FIG. 21 is a schematic plan view illustrating a main part of the present exemplary embodiment and FIG. 22 is a schematic cross-sectional view taken along Line B-B' of FIG. 21. Here, the diameter of the plugs 802 and 805 is about 0.5 μm and is smaller than those of other contact holes. Accordingly, the pixel pitch can be more narrowed. In this casei since the plug 802 is close to the TFT 30, the plug has a slight light-shielding function for the TFT 30. Incidentally, the contact hole using the plug generally has an aspect ratio of 1 or more.

The plugs 802 and 805 have a structure where, for example, Ti and TiN are sequentially formed from the outside and a W core is formed in the inside thereof. Specifically, the interlayer insulating films 42 and 43 are opened, for example, in the illustrated shape, and Ti with a thickness of 20 μm and TiN with a thickness of 25 nm are sequentially formed therein using a sputtering method. Since Ti reduces the contact resistance with the capacitor electrode 300 made of poly-silicon and TiN makes attachment of W easy, Ti and TiN are desirable. W is formed in a thickness of 500 nm using a CVD (Chemical Vapor Deposition) method. By using the CVD method, the coverage is much enhanced compared with the sputtering method, and thus even very deep hole can be filled clearly. However, in order to completely fill the hole using the above method, it is necessary to set the total thickness of films to, be formed to the radius of the hole or more. Accordingly, it is preferable that the diameter of the plugs 802 and 805 are designed to be small. Last, using an etch-back method, the stacked portions of filling materials are removed from the surface of the third interlayer insulating film 43. Hitherto, an example where the plug is formed out of three layers of Ti/TiN/W is described, but exemplary embodiments of the present invention are not limited to this structure and one of the respective layers may be used.

Since the plugs 802 and 805 have different lengths, the respective holes may be formed separately, and both holes may be formed simultaneously using the second relay electrode 6a2 as a stopper. In the latter, since the plugs 802 and 805 can be simultaneously formed, it is possible to reduce the number of processes, compared with the related art case.

In this way, in the fourth exemplary embodiment, since the pixel electrode 9a and the second relay electrode 6a2 opposite to each other with the interlayer insulating films 43 and 44 therebetween are integrally connected through the plug 805 and the capacitor line 400 and the capacitor electrode 300 opposite to each other with the interlayer insulating films 42 and 43 therebetween are integrally connected to each other through the plug 802, it is very advantageous for decrease in pitch. The other advantages are similar to those of the third exemplary embodiment.

6: Electronic Apparatus

Next, the whole structure, specifically, an optical structure of an exemplary embodiment of a projection color display apparatus which is an example of an electronic apparatus employing the aforementioned electro-optical devices as light valves will be described. Here, FIG. 23 is a schematic cross-sectional view of the projection color display apparatus.

Figure 23:
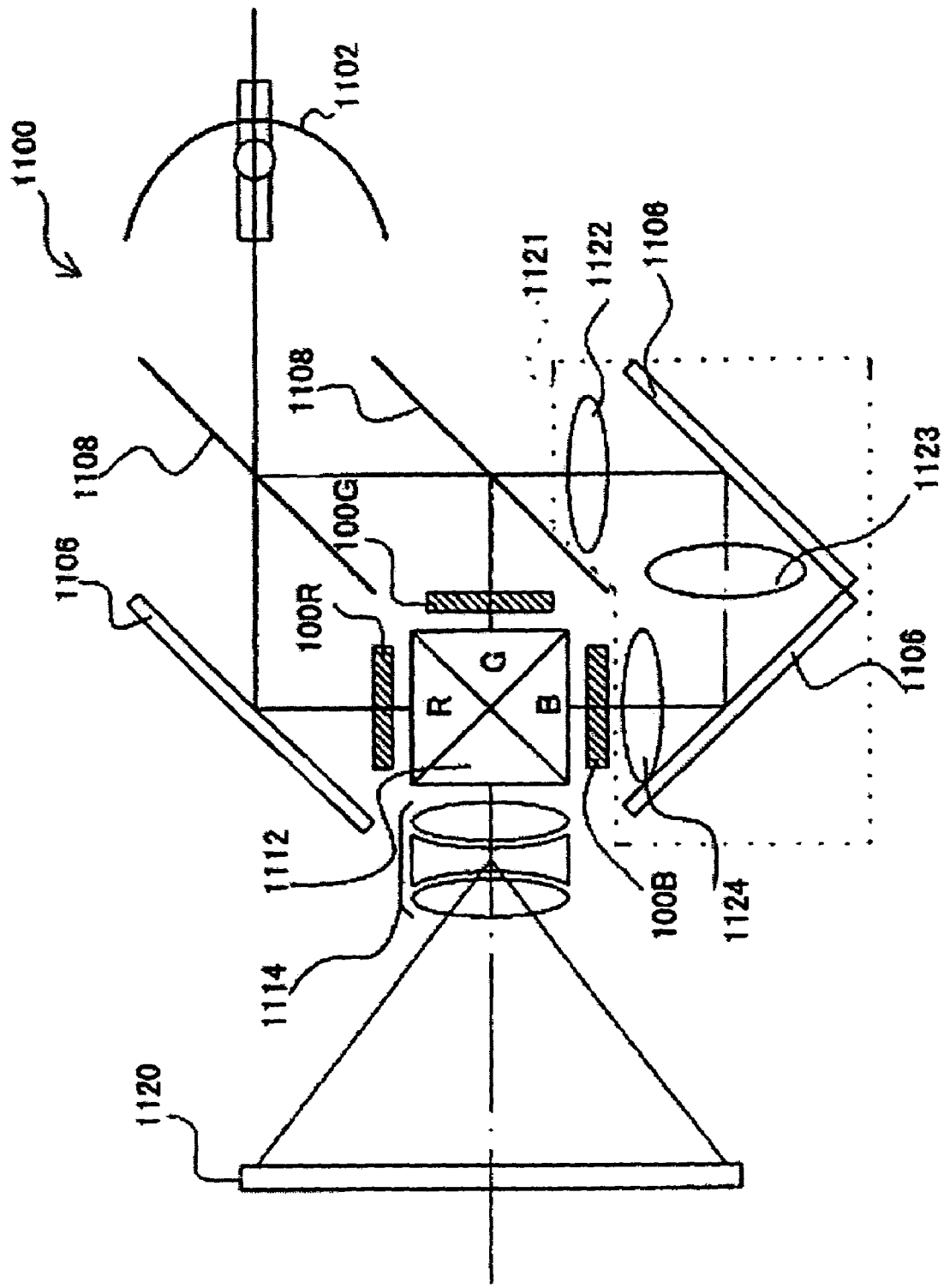
FIG. 23 is a cross-sectional view schematically illustrating a color liquid crystal projector as an example of a projection color display apparatus which is an exemplary embodiment of an electronic apparatus according to exemplary embodiments of the present invention.

FIG. 23, a liquid crystal projector 1100 which is an example of a projection color display apparatus in the first to fourth exemplary embodiments includes three liquid crystal modules having a liquid crystal display device in which the driving circuits are mounted on the TFT array substrate, and the three liquid crystal modules are used as light valves 100R, 100G, and 100B for RGB colors. In the liquid crystal projector 1100, when projection light is emitted from a lamp unit 1102 which is a white light source such as a metal halide lamp, etc., the projection light is divided into light components R, G, and B corresponding to three primary colors of RGB by three sheets of mirrors 1106 and two sheets of dichroic mirrors 1108, and the light components are guided to the light valves 100R, 100G, and 100B corresponding to the respective colors. At this time, the B light component is guided through a relay lens system 1121 including an incident lens 1122, a relay lens 1123, and an emission lens 1124 so as to reduce or prevent loss of light due to a long optical path. The light components corresponding to three primary colors, which are modulated by the light valves 100R, 100G, and 100B, respectively, are synthesized again by a dichroic prism 1112 and the synthesized light is projected as a color image onto a screen 1120 through a projection lens 1114.

Exemplary embodiments of the present invention are not limited to the aforementioned exemplary embodiments, and may be properly modified without departing from the range of the gist or spirit of the invention based on the appended claims and specification. Therefore, electro-optical devices having such modifications and electronic apparatuses comprising the electro-optical devices are also included in the technical scope of exemplary embodiments of the present invention.

What is claimed is:

1. An electro-optical device, comprising:
  a data line and a scanning line extending on a substrate to intersect each other;
  a thin film transistor disposed to correspond to an intersection between the data line and the scanning line on the substrate as viewed in plan;
  a storage capacitor formed above the thin film transistor and having a fixed-potential side electrode and a pixel-potential side electrode oppositely disposed with a dielectric film therebetween;
  a plurality of interlayer insulating films disposed on the storage capacitor;

a contact hole integrally penetrating the plurality of interlayer insulating films in a non-open area between pixels;

a shield layer formed on the plurality of interlayer insulating films and including a first conductive light-shielding film electrically connected to the fixed-potential side electrode of the storage capacitor through the contact hole; and a pixel electrode formed on the interlayer insulating films at a position above the shield layer and electrically connected to the thin film transistor through the pixel-potential side electrode of the storage capacitor.

2. The electro-optical device according to claim 1, further comprising a second conductive light-shielding film disposed in the non-open area as two-dimensionally seen and disposed between the plurality of interlayer insulating films, the contact hole penetrating an area where the second conductive light-shielding film is not formed in the non-open area as two-dimensionally seen, and the pixel electrode is electrically connected to the pixel-potential side electrode through a part of the second conductive light-shielding film.

3. The electro-optical device according to claim 2, the data line being disposed on the interlayer insulating film on which the second conductive light-shielding film is formed and being made of a same material as the second conductive light-shielding film.

4. The electro-optical device according to claim 1, one edge of the contact hole extending along one end of the thin film transistor as two-dimensionally seen.

5. The electro-optical device according to claim 1, the contact hole being disposed such that at least a part thereof overlaps one end of the thin film transistor as two-dimensionally seen.

6. The electro-optical device according to claim 4, the contact hole being disposed in parallel to the thin film transistor in an extension direction of the non-open area, and a width of the contact hole is equal to or greater than a length of a channel region of the thin film transistor in a width direction of the non-open area.

7. The electro-optical device according to claim 1, the contact hole being formed as a plug.

8. The electro-optical device according to claim 1, the contact hole having an aspect ratio of 1 or less.

9. The electro-optical device according to claim 8, the contact hole being filled with an underlying film formed on the shield layer and the surface of the underlying film being subjected to a planarization process.

10. An electro-optical device, comprising:

a data line and a scanning line extending on a substrate to intersect each other;

a thin film transistor disposed to correspond to an intersection between the data line and the scanning line on the substrate as two-dimensionally seen;

a storage capacitor formed above the thin film transistor and having a fixed-potential side electrode and a pixel-potential side electrode electrically connected to the thin film transistor, both electrodes being oppositely disposed with a dielectric film therebetween;

a plurality of interlayer insulating films disposed on the storage capacitor;

a shield layer made of a first conductive light-shielding film which is formed above the storage capacitor and between the plurality of interlayer insulating films in a non-open area between pixels as seen two-dimensionally and which is electrically connected to the fixed-potential side electrode;

a pixel-electrode contact hole formed using the plurality of interlayer insulating films as an underlying layer and integrally penetrating the plurality of interlayer insulating films in an area where the shield layer does not exist in the non-open area as seen two-dimensionally; and a pixel electrode electrically connected to the pixel-potential side electrode of the storage capacitor through the pixel-electrode contact hole.

11. The electro-optical device according to claim 10, the pixel-electrode contact hole extending in an extension direction of the non-open area as seen two-dimensionally.

12. The electro-optical device according to claim 10, the pixel-electrode contact hole being formed as a plug.

13. The electro-optical device according to claim 10, the pixel-electrode contact hole having an aspect ratio of 1 or less.

14. The electro-optical device according to claim 10, further comprising a second conductive light-shielding film disposed between the shield layer and the fixed-potential side electrode and in the non-open area as seen two-dimensionally, the pixel electrode being integrally connected to a part of the second conductive light-shielding film through the pixel-electrode contact hole.

15. The electro-optical device according to claim 14, the data line being disposed on the interlayer insulating film in which the second conductive light-shielding film is disposed and being made of a same material as the second conductive light-shielding film.

16. The electro-optical device according to claim 14, the shield layer being electrically connected to the fixed-potential side electrode through a shield-layer contact hole which is formed using one interlayer insulating film stacked below the shield layer among the plurality of interlayer insulating films and another interlayer insulating film disposed on the storage capacitor as underlying layers, and which integrally penetrates the one and another interlayer insulating films in an area where the second conductive light-shielding film does not exist in the non-open area as seen two-dimensionally.

17. The electro-optical device according to claim 16, the one interlayer insulating film stacked below the shield layer being an interlayer insulating film included in the plurality of interlayer insulating films penetrated by the pixel-electrode contact hole, and the shield-layer contact hole is disposed closer to the thin film transistor than the pixel-electrode contact hole.

18. The electro-optical device according to claim 16, the shield-layer contact hole being formed as a plug.

19. The electro-optical device according to claim 16, the shield-layer contact hole having an aspect ratio of 1 or less.

20. An electronic apparatus comprising the electro-optical device according to claim 1.

21. A method of manufacturing an electro-optical device comprising a data line and a scanning line extending on a substrate to intersect each other, a thin film transistor disposed to correspond to an intersection between the data line and the scanning line on the substrate as seen two-dimensionally, a storage capacitor having a pixel-potential side electrode and a fixed-potential side electrode and formed above the thin film transistor which is electrically connected to the pixel-potential side electrode, a shield layer made of a first conductive light-shielding film formed above the storage capacitor and in a non-open area between pixels as seen two-dimensionally and electrically connected to the fixed-potential side electrode, and stacked between a plurality of interlayer insulating films, and a pixel electrode formed using the plurality of interlayer insulating films as an underlying layer and electrically connected to the pixel-potential side electrode of the storage capacitor, the method comprising:

forming the thin film transistor in an area corresponding to an intersection between the data line and the scanning line on the substrate as seen two-dimensionally;

forming the storage capacitor above the thin film transistor;

stacking the plurality of interlayer insulating films on the storage capacitor, with a second conductive light-shielding film connected to the pixel-potential side electrode of the storage capacitor therebetween;

opening a shield-layer contact hole on a surface of the plurality of interlayer insulating films, so that the shield-layer contact hole integrally penetrates the plurality of interlayer insulating films in an area where the second conductive light-shielding film is not formed in the non-open area as seen two-dimensionally, and reaches the fixed-potential side electrode of the storage capacitor;

forming the shield layer on the surface of the interlayer insulating film in which the shield-layer contact hole is opened;

forming an underlying layer, which serves as a base of the pixel electrode, on the shield layer;

opening a pixel-electrode contact hole, which electrically connects the pixel electrode to a part of the second conductive light-shielding film, on the surface of the underlying layer, so that the pixel-electrode contact hole integrally penetrates a plurality of layers including the underlying layer and reaches the part of the second conductive light-shielding film; and forming the pixel electrode on the surface of the underlying layer in which the pixel-electrode contact hole is opened.

* * * * *